United States Patent
Yasui

(10) Patent No.: US 10,379,272 B2
(45) Date of Patent: Aug. 13, 2019

(54) OPTICAL SYSTEM AND IMAGE PICKUP APPARATUS INCLUDING THE SAME

(71) Applicant: CANON KABUSHIKI KAISHA, Tokyo (JP)

(72) Inventor: Hiroto Yasui, Saitama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/910,261

(22) Filed: Mar. 2, 2018

(65) Prior Publication Data
US 2018/0259690 A1    Sep. 13, 2018

(30) Foreign Application Priority Data
Mar. 8, 2017 (JP) .................... 2017-043748

(51) Int. Cl.
| | | |
|---|---|---|
| G02B 5/18 | (2006.01) | |
| G02B 27/64 | (2006.01) | |
| G02B 13/02 | (2006.01) | |
| G02B 13/00 | (2006.01) | |
| G02B 15/17 | (2006.01) | |
| G02B 27/42 | (2006.01) | |

(52) U.S. Cl.
CPC ........ G02B 5/1814 (2013.01); G02B 5/1842 (2013.01); G02B 5/1866 (2013.01); G02B 13/0045 (2013.01); G02B 13/02 (2013.01); G02B 15/17 (2013.01); G02B 27/4211 (2013.01); G02B 27/4216 (2013.01); G02B 27/646 (2013.01); G02B 2005/1804 (2013.01)

(58) Field of Classification Search
CPC .. G02B 5/1814; G02B 5/1842; G02B 5/1866; G02B 13/0045; G02B 13/02; G02B 15/17; G02B 27/4211; G02B 27/4216; G02B 27/646; G02B 2005/1804
USPC ......................................... 359/566
See application file for complete search history.

(56) References Cited

U.S. PATENT DOCUMENTS 8,194,319 B2 * 6/2012 Koga ................ G02B 27/42
359/566

FOREIGN PATENT DOCUMENTS

| JP | 2010145797 A | 7/2010 |
|---|---|---|
| WO | 2011024258 A1 | 3/2011 |

* cited by examiner

*Primary Examiner* — Wen Huang
(74) *Attorney, Agent, or Firm* — Carter, DeLuca & Farrell LLP

(57) ABSTRACT

Provided is an optical system including a front unit, an aperture stop and a rear unit which are arranged in order from an object side to an image side. The front unit includes a diffractive optical element, at least one first refractive optical element having a power in the same sign as a sign of a power at a diffractive surface of the diffractive optical element, and at least one second refractive optical element having a power in a different sign from the sign of the power at the diffractive surface. A partial dispersion ratio between a d-line and a C-line and a partial dispersion ratio between a g-line and the d-line of the at least one first refractive optical element and the at least one second refractive optical element are appropriately set.

13 Claims, 6 Drawing Sheets

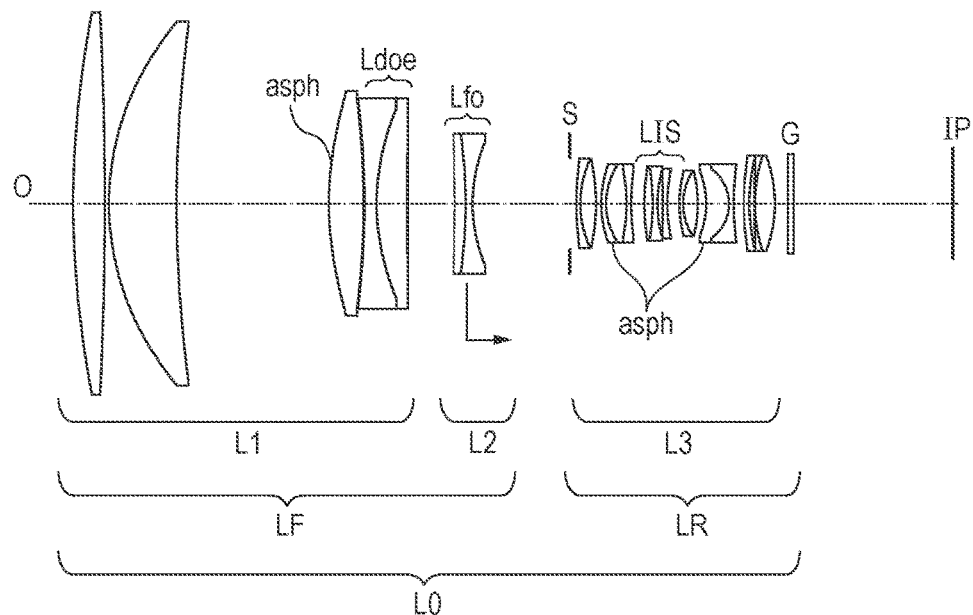
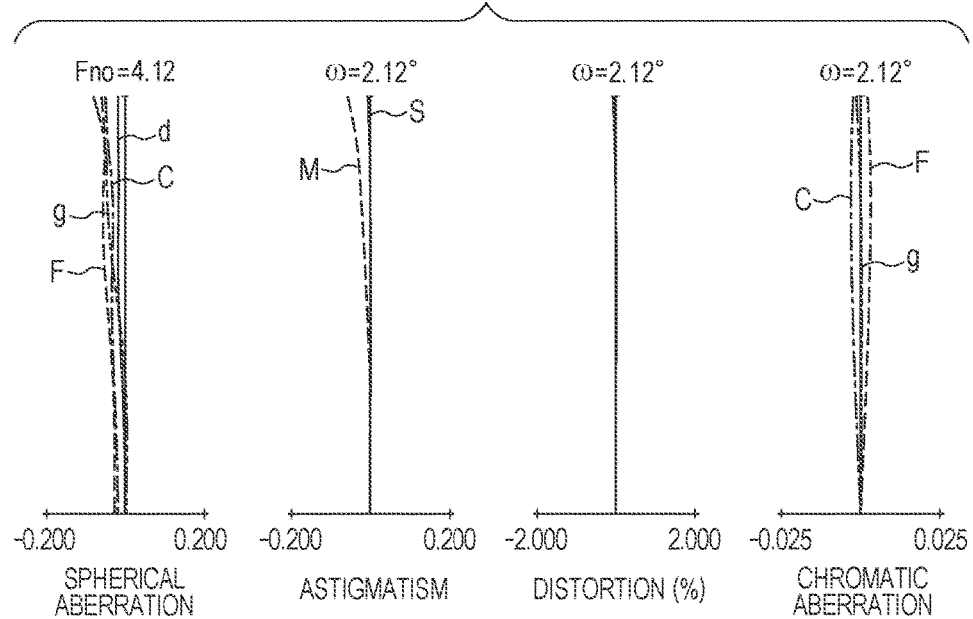

OPTICAL SYSTEM AND IMAGE PICKUP APPARATUS INCLUDING THE SAME

BACKGROUND OF THE INVENTION

Field of the Invention

The present invention relates to an optical system and an image pickup apparatus including the optical system, which are suitable for, for example, a video camera, a digital still camera, a television (TV) camera, a monitoring camera, and a film camera using a silver-halide film.

Description of the Related Art

In general, in optical systems that are used in image pickup apparatus, an axial chromatic aberration and a lateral chromatic aberration are increased as the total lens length (distance from first lens surface to image plane) is reduced and the entire optical system is downsized. In telephoto optical systems, the chromatic aberration is increased as a focal length is increased. In order to correct the chromatic aberration over a visible wavelength range in such optical systems, it is required to correct chromatic aberrations of four wavelengths of a d-line, a g-line, a C-line, and an F-line of the Fraunhofer lines.

In general, as a method of reducing the chromatic aberration, there are known a method using an anomalous partial dispersion material as an optical material and a method using a diffractive optical element. However, a high-dispersion optical material has a higher partial dispersion ratio for the g-line and the d-line than that of a low-dispersion optical material. Therefore, when an achromatization method is employed to correct the chromatic aberration between the F-line and the C-line, the chromatic aberration of the g-line is apt to worsen.

Meanwhile, as a method of correcting the chromatic aberration of the g-line, there is well known a method using a diffractive optical element in an optical path. The diffractive optical element has an anomalous partial dispersion characteristic, and also has a small numerical value of 0.89 corresponding to the partial dispersion ratio for the g-line and the d-line. Thus, the diffractive optical element is effective for correction of the chromatic aberration of the g-line. Further, an absolute value of a numerical value corresponding to an Abbe number is a small value of 3.45. Thus, only minute optical power is caused by diffraction, and the chromatic aberration can be corrected with little influence on various aberrations such as a spherical aberration, a coma, and an astigmatism.

In view of this, there has been disclosed an optical system in which, because there is redundant power in a refractive optical element used together with the diffractive optical element, the total lens length is reduced and a glass material used for the refractive optical element is changed to a glass material having a relatively small specific gravity, to thereby reduce the lens weight (Japanese Patent Application Laid-Open No. 2010-145797).

Further, as another method of correcting the chromatic aberration in the visible wavelength range, there is known a method using in combination the diffractive optical element and the refractive optical element having an anomalous partial dispersion characteristic. There has been proposed an optical system configured to correct the chromatic aberration with use of this method (International Publication No. WO 2011/024258). In International Publication No. WO 2011/024258, there is disclosed a material range of an optical material having an anomalous partial dispersion characteristic, which is optimum for correction of chromatic aberrations of the four wavelengths of the d-line, the g-line, the C-line, and the F-line so that the chromatic aberration is corrected over the visible wavelength range in the optical system including the diffractive optical element.

In Japanese Patent Application Laid-Open No. 2010-145797, the total lens length of the telephoto lens is reduced by the chromatic aberration correction effect of the diffractive optical element, and various aberrations such as the spherical aberration worsened due to the increased refractive power of the refractive optical element in the telephoto lens are corrected by an aspheric lens. In this manner, various aberrations are corrected, and the entire optical system is reduced in size and weight.

When such an achromatization method as that of Japanese Patent Application Laid-Open No. 2010-145797 is used, the chromatic aberration can be corrected to a level without any practical problem in image pickup with use of the existing image pickup apparatus, but the method may be insufficient for the future image pickup apparatus compatible with high resolution and high image quality. In particular, it has been difficult to simultaneously correct the chromatic aberration of the g-line and the chromatic aberration between the F-line and the C-line. The reason is because the chromatic aberration caused in the diffractive optical element changes in proportion to the wavelength. The chromatic aberration caused in the diffractive optical element has a proportional relationship with the wavelength, and the slope of the chromatic aberration with respect to the wavelength between the F-line and the C-line is the same as the slope of the chromatic aberration with respect to the wavelength between the g-line and the F-line.

In contrast, the chromatic aberration caused in a general optical material changes in a curved manner with respect to the wavelength, and the slope of the curve tends to increase as the wavelength becomes shorter. Therefore, the slope of the chromatic aberration with respect to the wavelength between the F-line and the C-line differs from the slope of the chromatic aberration with respect to the wavelength between the g-line and the F-line. Thus, when the chromatic aberration caused in the general optical material is corrected by the diffractive optical element, and a power required for correcting the chromatic aberration between the g-line and the F-line is given to the diffractive optical element, the chromatic aberration between the F-line and the C-line remains. Conversely, when a power required for correcting the chromatic aberration between the F-line and the C-line is given to the diffractive optical element, the chromatic aberration between the g-line and the F-line remains.

Therefore, when the diffractive optical element is used in the optical system as in Japanese Patent Application Laid-Open No. 2010-145797, it has been difficult to simultaneously correct the chromatic aberration of the g-line and the chromatic aberration between the F-line and the C-line.

Meanwhile, in International Publication No. WO 2011/024258, in order to solve the problem in Japanese Patent Application Laid-Open No. 2010-145797, there is defined a material range of the optical material capable of simultaneously correcting the chromatic aberration of the g-line and the chromatic aberration between the F-line and the C-line in the optical system using the diffractive optical element. In this optical system using the diffractive optical element, the diffractive optical element and the refractive optical element made of an optical material having a desired material characteristic are used on at least one of an object side or an image side with respect to a stop.

However, the above-mentioned technology is based on the premise that the refractive optical element uses a resin material as the optical material having a desired material characteristic, and a refractive optical unit made of a resin material is arranged in the vicinity of an optical surface at which the diffractive optical element is arranged. Along therewith, as the refractive optical unit made of a resin material, a lens having a relatively large aperture diameter is used with its optical surface having a refractive power (with increased thickness of the resin material), and hence there have been problems in surface accuracy of the lens itself and in resistance to environment.

SUMMARY OF THE INVENTION

In view of the above-mentioned problems, the present invention provides a downsized and lightweight optical system using a diffractive optical element, in which an optical material (mainly a glass material) having a desired material characteristic and an excellent manufacturing accuracy and resistance to environment is used to satisfactorily correct a chromatic aberration over an entire visible wavelength range.

According to one embodiment of the present invention, there is provided an optical system including a front unit, an aperture stop, and a rear unit, which are arranged in order from an object side to an image side, the front unit including a diffractive optical element, at least one first refractive optical element having a power in the same sign as a sign of a power at a diffractive surface of the diffractive optical element, and at least one second refractive optical element having a power in a different sign from the sign of the power at the diffractive surface, in which the following conditional expression is satisfied:

$$0.001 < \sum_{i=1}^{M} |\delta \theta_{dC\_fsi}|/M < 0.010$$

where $\delta\theta_{dC\text{-}fsi}$ is defined as $\theta_{dC\text{-}fsi} - (-0.1968 \times \theta_{gd\text{-}fsi} + 0.548)$, and $\theta_{dC\text{-}fsi}$ and $\theta_{gd\text{-}fsi}$ represent a partial dispersion ratio between a d-line and a C-line and a partial dispersion ratio between a g-line and the d-line, respectively, of a material of an i-th (i is an integer of 1 or more and M or less, and M is an integer of 1 or more) first refractive optical element counted from the object side among the at least one first refractive optical element, and in which the following conditional expression is satisfied:

$$0.0001 < \sum_{j=1}^{N} |\delta \theta_{dC\_fdj}|/N < 0.0010$$

where $\delta\theta_{dC\text{-}fdj}$ is defined as $\theta_{dC\text{-}fdj} - (-0.1968 \times \theta_{gd\text{-}fdj} + 0.548)$, and $\theta_{dC\text{-}fdj}$ and $\theta_{gd\text{-}fdj}$ represent a partial dispersion ratio between the d-line and the C-line and a partial dispersion ratio between the g-line and the d-line, respectively, of a material of a j-th (j is an integer of 1 or more and N or less, and N is an integer of 1 or more) second refractive optical element counted from the object side among the at least one second refractive optical element.

Further features of the present invention will become apparent from the following description of exemplary embodiments with reference to the attached drawings.

BRIEF DESCRIPTION OF THE DRAWINGS

FIG. 1 is a lens cross-sectional view of an optical system according to Example 1 of the present invention when focused on an object at infinity.

FIG. 2 is aberration diagrams of the optical system according to Example 1 of the present invention when focused on the object at infinity.

DESCRIPTION OF THE EMBODIMENTS

Preferred embodiments of the present invention will now be described in detail in accordance with the accompanying drawings.

First, a feature of an optical system according to the present invention is described.

As described above, the present invention has an object to provide a downsized and lightweight optical system using a diffractive optical element, in which an optical material (mainly a glass material) having a desired material characteristic and an excellent manufacturing accuracy and resistance to environment is used to satisfactorily correct a chromatic aberration over an entire visible wavelength range.

In order to achieve this object, in the optical system including the diffractive optical element and a refractive optical element, it is required to select an optical material having a material characteristic that has a good compatibility with a dispersion characteristic of the diffractive optical element and to use the selected optical material for the refractive optical element so that the chromatic aberration in the entire optical system is satisfactorily corrected over the entire visible wavelength range. Further, in this case, the selected optical material is desired to have a relatively small specific gravity.

Specifically, the optical system according to the present invention is an optical system including a front unit, an aperture stop, and a rear unit in the stated order from an object side, and the front unit includes a diffractive optical element and a plurality of refractive optical elements. In the present invention, the diffractive optical element and the refractive optical elements are combined as appropriate so that respective conditional expressions to be described later are satisfied. In this manner, a chromatic aberration between an F-line and a C-line, which is worsened when a chromatic aberration of a g-line is corrected by the diffractive optical element, is corrected by the refractive optical elements. As a result, the chromatic aberration of the g-line and the chromatic aberration between the F-line and the C-line can simultaneously be made close to 0. Thus, an optical system in which the chromatic aberration is satisfactorily corrected over the entire visible wavelength range can be achieved.

Now, an exemplary embodiment of the present invention is described in detail with reference to the accompanying drawings. The optical system according to the present invention includes a front unit, an aperture stop, and a rear unit, which are arranged in order from an object side to an image side. The front unit includes a diffractive optical element and a plurality of refractive optical elements.

Figure 3:
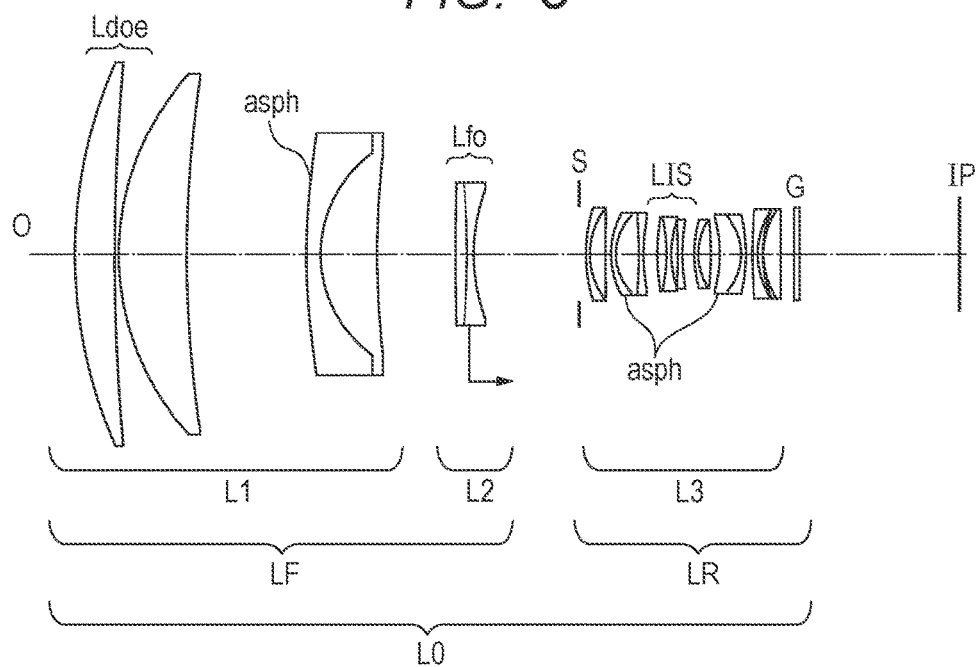
FIG. 3 is a lens cross-sectional view of an optical system according to Example 2 of the present invention when focused on an object at infinity.
Figure 4:
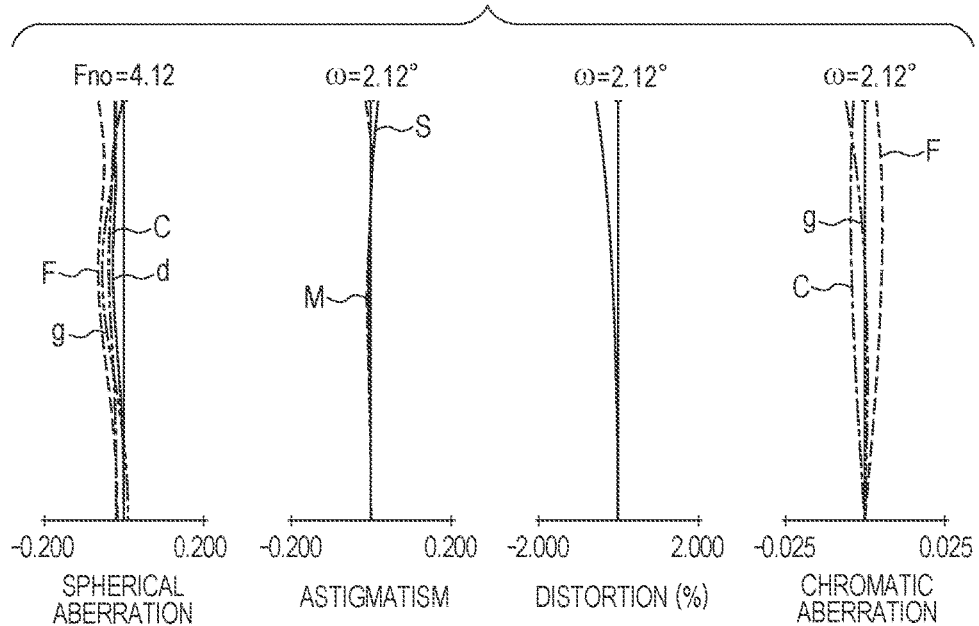
FIG. 4 is aberration diagrams of the optical system according to Example 2 of the present invention when focused on the object at infinity.
Figure 5:
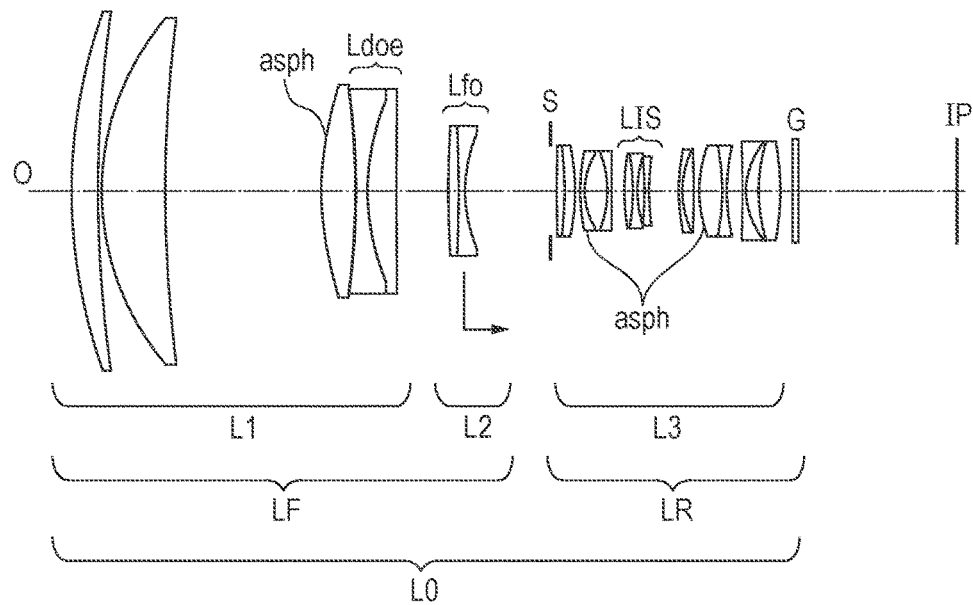
FIG. 5 is a lens cross-sectional view of an optical system according to Example 3 of the present invention when focused on an object at infinity.
Figure 6:
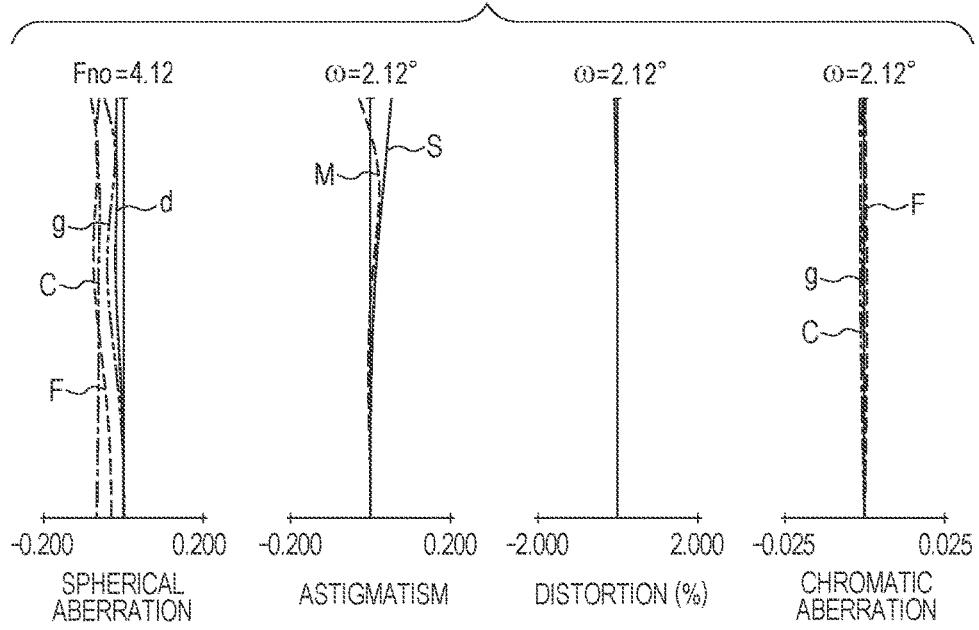
FIG. 6 is aberration diagrams of the optical system according to Example 3 of the present invention when focused on the object at infinity.

FIG. 1 and FIG. 2 are a lens cross-sectional view and aberration diagrams, respectively, of an optical system according to Example 1 of the present invention. FIG. 3 and FIG. 4 are a lens cross-sectional view and aberration diagrams, respectively, of an optical system according to Example 2 of the present invention. FIG. 5 and FIG. 6 are a lens cross-sectional view and aberration diagrams, respectively, of an optical system according to Example 3 of the present invention.

In the lens cross-sectional views, an optical system L0 includes a front unit LF, an aperture stop S, and a rear unit LR. A first lens unit L1 has a positive refractive power, and a second lens unit L2 has a negative refractive power and is configured to move on an optical axis toward the image side along with change in focus from an object at infinity to an object in close proximity. A third lens unit L3 has a negative refractive power. The first lens unit L1 includes a diffractive optical element Ldoe and an aspheric surface "asph".

The aperture stop S is arranged between the second lens unit L2 and the third lens unit L3. An optical axis O and an image plane IP are illustrated. The image plane IP corresponds to an image pickup surface of an image pickup element. A glass block G is, for example, a crystal low-pass filter or an infrared cut filter. A diffractive surface in the diffractive optical element Ldoe is formed at a cemented surface of a cemented lens obtained by cementing a negative lens and a positive lens, or at one optical surface of the refractive optical element. The third lens unit L3 includes a lens unit (image stabilizing lens unit) LIS configured to move in a direction having a component perpendicular to the optical axis during image blur correction.

FIG. 2, FIG. 4, and FIG. 6 are aberration diagrams of Example 1, Example 2, and Example 3, respectively, when an object distance is at infinity. In the spherical aberration diagrams of FIG. 2, FIG. 4, and FIG. 6, a solid line "d" represents a d-line, a long dashed double-short dashed line "g" represents a g-line, a long dashed short dashed line C represents a C-line, and a dotted line F represents an F-line. In the astigmatism diagrams, a solid line S represents a sagittal ray of the d-line, and a dotted line M represents a meridional ray of the d-line. Further, in the lateral chromatic aberration diagrams, a long dashed double-short dashed line "g" represents the g-line, a long dashed short dashed line C represents the C-line, and a dotted line F represents the F-line. In the aberration diagrams, Fno represents an F-number, and ω represents an image-pickup half angle of view (degree).

The optical system of the present invention L0 includes the front unit LF, the aperture stop S, and the rear unit LR, which are arranged in order from the object side to the image side.

The front unit LF includes the diffractive optical elements Ldoe and the plurality of refractive optical elements. Among the plurality of refractive optical elements included in the front unit LF, a refractive optical element having a refractive power in the same sign as that of a power of the diffractive surface of the diffractive optical element Ldoe is as follows.

A partial dispersion ratio between the d-line and the C-line and a partial dispersion ratio between the g-line and the d-line of the Fraunhofer lines of an optical material of an i-th (i is an integer of 1 or more and M or less, and M is an integer of 1 or more) refractive optical element counted from the object side are represented by $\theta_{dc\text{-}fsi}$ and $\theta_{gd\text{-}fsi}$, respectively. An anomalous partial dispersion ratio $\delta\theta_{dc\text{-}fsi}$ is represented by $\delta\theta_{dc\text{-}fsi} = \theta_{dc\text{-}fsi} - (-0.1968 \times \theta_{gd\text{-}fsi} + 0.548)$. Among the plurality of refractive optical elements included in the front unit LF, a refractive optical element having a refractive power in a different sign from that of the power of the diffractive surface of the diffractive optical element is as follows.

A partial dispersion ratio between the d-line and the C-line and a partial dispersion ratio between the g-line and the d-line of the Fraunhofer lines of an optical material of a j-th (j is an integer of 1 or more and N or less, and N is an integer of 1 or more) refractive optical element counted from the object side are represented by $\theta_{dC\text{-}fdj}$ and $\theta_{gd\text{-}fdj}$, respectively. An anomalous partial dispersion ratio $\delta\theta_{dC\text{-}fdj}$ is represented by $\delta\theta_{dC\text{-}fdj} = \theta_{dC\text{-}fdj} - (-0.1968 \times \theta_{gd\text{-}fdj} + 0.548)$.

In this case, the parameters related to Conditional Expressions (1) and (2) are as follows. Refractive indices with respect to the d-line, the g-line, the C-line, and the F-line of the optical material in the refractive optical element having the refractive power in the same sign as that of the power of the diffractive surface of the diffractive optical element are represented by $nd_{fsi}$, $ng_{fsi}$, $nC_{fsi}$, and $nF_{fsi}$, respectively.

The partial dispersion ratio $\theta_{dC\text{-}fsi}$ between the d-line and the C-line and the partial dispersion ratio $\theta_{gd\text{-}fsi}$ between the g-line and the d-line of the optical material forming the refractive optical element are as follows.

$$\theta_{dC\text{-}fsi} = (nd_{fsi} - nC_{fsi})/(nF_{fsi} - nC_{fsi})$$

$$\theta_{gd\text{-}fsi} = (ng_{fsi} - nd_{fsi})/(nF_{fsi} - nC_{fsi})$$

Refractive indices with respect to the d-line, the g-line, the C-line, and the F-line of the optical material in the refractive optical element having the refractive power in the different sign from that of the power of the diffractive surface of the diffractive optical element are represented by $nd_{fdj}$, $ng_{fdj}$, $nC_{fdj}$, and $nF_{fdj}$, respectively. A partial dispersion ratio $\theta_{dC\text{-}fdj}$ between the d-line and C-line and a partial dispersion ratio $\theta_{gd\text{-}fdj}$ between the g-line and the d-line of the optical material forming the refractive optical element are as follows.

$$\theta_{dC\text{-}fdj} = (nd_{fdj} - nC_{fdj})/(nF_{fdj} - nC_{fdj})$$

$$\theta_{gd\text{-}fdj} = (ng_{fdj} - nd_{fdj})/(nF_{fdj} - nC_{fdj})$$

At this time, the following conditional expressions are satisfied.

$$0.001 < \sum_{i=1}^{M} |\delta\theta_{dC\text{-}fsi}|/M < 0.010 \tag{1}$$

$$0.0001 < \sum_{j=1}^{N} |\delta\theta_{dC\text{-}fdj}|/N < 0.0010 \tag{2}$$

Further, the optical system L0 according to the present invention is preferred to satisfy at least one of the following conditional expressions.

The rear unit LR is formed of only refractive optical elements. A partial dispersion ratio between the d-line and the C-line and a partial dispersion ratio between the g-line and the d-line of the Fraunhofer lines of an optical material of an i-th (i is an integer of 1 or more and K or less, and K is an integer of 1 or more) refractive optical element counted from the object side in the rear unit LR are represented by $\theta_{dC-bi}$ and $\theta_{gd-bi}$, respectively. Further, an anomalous partial dispersion ratio $\delta\theta_{dC-bi}$ is represented by $\delta\theta_{dC-bi}=\theta_{dC-bi}-(-0.1968\times\theta_{gd-bi}+0.548)$. A partial dispersion ratio between the d-line and the C-line and a partial dispersion ratio between the g-line and the d-line of the Fraunhofer lines at the diffractive surface of the diffractive optical element Ldoe are represented by $\theta_{dC-DO}$ and $\theta_{gd-DO}$, respectively. An anomalous partial dispersion ratio $\delta\theta_{dC-DO}$ is represented by $\delta\theta_{dC-DO}=\theta_{dC-DO}-(-0.1968\times\theta_{gd-DO}+0.548)$.

A refractive power of an i-th refractive optical element counted from the object side in the rear unit LR is represented by $\varphi_{bi}$. An Abbe number of an optical material of the i-th refractive optical element counted from the object side in the rear unit LR is represented by $vd_{bi}$. A height of incidence of an axial paraxial ray at a position at which the i-th refractive optical element is arranged in the optical system L0 is represented by $h_{bi}$. A power (value satisfying $\varphi_{DO}=-2\times m\times C1\times\lambda/\lambda0$) of the diffractive surface of the diffractive optical element Ldoe is represented by $\varphi_{DO}$. An Abbe number of the diffractive optical element Ldoe is represented by $vd_{DO}$. A height of incidence of an axial paraxial ray at a position at which the diffractive surface is arranged in the optical system L0 is represented by $h_{DO}$.

In this case, when the focal length of the i-th refractive optical element is represented by $f_{bi}$, the following expression is obtained.

$$\varphi_{bi}=1/f_{bi}$$

When the refractive indices with respect to the d-line, the g-line, the C-line, and the F-line of the optical material of the i-th refractive optical element are represented by $nd_{bi}$, $ng_{bi}$, $nC_{bi}$, and $nF_{bi}$, respectively, the following expressions are obtained.

$$vd_{bi}=(nd_{bi}-1)/(nF_{bi}-nC_{bi})$$

$$\theta_{dC-bi}=(nd_{bi}-nC_{bi})/(nF_{bi}-nC_{bi})\theta_{gd-bi}=(ng_{bi}-nd_{bi})/(nF_{bi}-nC_{bi})$$

In this case, a phase function representing a phase shape at the diffractive surface of the diffractive optical element is represented by $\psi(r)$, a design wavelength (reference wavelength) is represented by $\lambda0$, a height in a direction perpendicular to the optical axis is represented by "r", a design diffraction order is represented by "m", and a phase coefficient is represented by Ci (i is an integer of 1 or more). At this time, $\psi(r)$ is represented as follows.

$$\psi(r)=(2\times m\times\Pi/\lambda0)\times(C1\times r^2+C2\times r^4+C3\times r^6+C4\times r^8+C5\times r^{10}+\ldots)$$

At this time, a power $\varphi_{DO}$ at a certain wavelength $\lambda$ can be represented as follows.

$$\varphi_{do}=-2\times m\times C1\times\lambda/\lambda0$$

When the refractive indices with respect to the d-line, the g-line, the C-line, and the F-line of the diffractive surface of the diffractive optical element Ldoe are represented by $nd_{DO}$, $ng_{DO}$, $nC_{DO}$, and $nF_{DO}$, respectively, the following expressions are obtained.

$$vd_{DO}=(nd_{DO}-1)/(nF_{DO}-nC_{DO})$$

$$\theta_{dC-DO}=(nd_{DO}-nC_{DO})/(nF_{DO}-nC_{DO})\theta_{gd-DO}=(ng_{DO}-nd_{DO})/(nF_{DO}-nC_{DO})$$

At this time, the following conditional expression is satisfied.

$$-0.60 < \sum_{i=1}^{K} \frac{\phi_{bi}}{vd_{bi}}\delta\theta_{dC-bi}h_{bi}^2 \bigg/ \frac{\phi_{DO}}{vd_{DO}}\delta\theta_{dC-DO}h_{DO}^2 < -0.01 \quad (3)$$

Among the plurality of refractive optical elements included in the front unit LF, a refractive optical element having a refractive power in the same sign as that of the power of the diffractive surface of the diffractive optical element Ldoe is as follows.

An anomalous partial dispersion ratio $\Delta\theta_{gd-fsi}$ between the g-line and the d-line of the Fraunhofer lines of the optical material of the i-th (i is an integer of 1 or more and M or less, and M is an integer of 1 or more) refractive optical element counted from the object side is represented by $\Delta\theta_{gd-fsi}=\theta_{gd-fsi}-(-1.687\times10^{-7}\times vd_{fsi}^3+5.702\times10^{-5}\times vd_{fsi}^2-6.603\times10^{-3}\times vd_{fsi}+1.462)$. Among the plurality of refractive optical elements included in the front unit LF, a refractive optical element having a refractive power in a different sign from that of the power of the diffractive surface of the diffractive optical element Ldoe is as follows.

A partial dispersion ratio between the g-line and the d-line of the Fraunhofer lines of the optical material of the j-th (j is an integer of 1 or more and N or less, and N is an integer of 1 or more) refractive optical element counted from the object side is represented by $\theta_{gd-fdj}$. An anomalous partial dispersion ratio $\Delta\theta_{gd-fdj}$ is represented by $\Delta\theta_{gd-fdj}=\theta_{gd-fdj}-(-1.687\times10^{-7}\times vd_{fdj}^3+5.702\times10^{-5}\times vd_{fdj}^2-6.603\times10^{-3}\times vd_{fdj}+1.462)$.

An Abbe number $vd_{fsi}$ is represented as follows.

$$vd_{fsi}=(nd_{fsi}-1)/(nF_{fsi}-nC_{fsi})$$

An Abbe number $vd_{fdj}$ is represented as follows.

$$vd_{fdj}=(nd_{fdj}-1)/(nF_{fdj}-nC_{fdj})$$

At this time, the following conditional expressions are satisfied.

$$0.010 < \sum_{i=1}^{M} |\Delta\theta_{gd-fsi}|/M < 0.100 \quad (4)$$

$$0.001 < \sum_{j=1}^{N} |\Delta\theta_{gd-fdj}|/N < 0.010 \quad (5)$$

The rear unit LR is formed of only refractive optical elements. A partial dispersion ratio between the g-line and the d-line of the Fraunhofer lines of the optical material of the i-th (i is an integer of 1 or more and K or less, and K is an integer of 1 or more) refractive optical element counted from the object side in the rear unit LR is represented by $\theta_{gd-bi}$. An anomalous partial dispersion ratio $\Delta\theta_{gd-bi}$ is represented by $\Delta\theta_{gd-bi}=\theta_{gd-bi}-(-1.687\times10^{-7}\times vd_{bi}^3+5.702\times10^{-5}\times vd_{bi}^2-6.603\times10^{-3}\times vd_{bi}+1.462)$.

A partial dispersion ratio between the g-line and the d-line of the Fraunhofer lines at the diffractive surface of the diffractive optical element Ldoe is represented by $\theta_{gd-DO}$. An anomalous partial dispersion ratio $\Delta\theta_{gd-DO}$ is represented by $\Delta\theta_{gd-DO}=\theta_{gd-DO}-(-1.687\times10^{-7}\times vd_{DO}^3+5.702\times10^{-5}\times$ $vd_{DO}^2 - 6.603 \times 10^{-3} \times vd_{DO} + 1.462)$. At this time, the following conditional expression is satisfied.

$$-0.100 < \sum_{i=1}^{K} \frac{\phi_{bi}}{vd_{bi}} \Delta \theta_{gd-bi} h_{bi}^2 \Big/ \frac{\phi_{DO}}{vd_{DO}} \Delta \theta_{gd-DO} h_{DO}^2 < -0.005 \quad (6)$$

The diffractive optical element Ldoe and the i-th (i is an integer of 1 or more and K or less, and K is an integer of 1 or more) refractive optical element counted from the object side in the rear unit LR are as follows.

A height of incidence of a pupil paraxial ray at a position at which the i-th refractive optical element counted from the object side of the rear unit is arranged in the optical system is represented as follows.

$\bar{h}_{bi}$

A height of incidence of a pupil paraxial ray at a position at which the diffractive surface is arranged in the optical system L0 is represented as follows.

$\bar{h}_{DO}$

At this time, the following conditional expressions are satisfied.

$$-1.00 < \sum_{i=1}^{K} \frac{\phi_{bi}}{vd_{bi}} \delta \theta_{dC-bi} h_{bi} \bar{h}_{bi} \Big/ \frac{\phi_{DO}}{vd_{DO}} \delta \theta_{dC-DO} h_{DO} \bar{h}_{DO} < -0.05 \quad (7)$$

$$0.05 < \sum_{i=1}^{K} \frac{\phi_{bi}}{vd_{bi}} \Delta \theta_{gd-bi} h_{bi} \bar{h}_{bi} \Big/ \frac{\phi_{DO}}{vd_{DO}} \Delta \theta_{gd-DO} h_{DO} \bar{h}_{DO} < 1.00 \quad (8)$$

The front unit LF includes the plurality of refractive optical elements. A largest length among intervals on the optical axis between the plurality of refractive optical elements of the front unit LF is represented by $L_{ff}$. A total lens length obtained when focused on an object at infinity is represented by $L_{TOT}$. At this time, the following conditional expression is satisfied.

$$0.05 < L_{ff}/L_{TOT} < 0.50 \quad (9)$$

Next, the technical meanings of the above-mentioned conditional expressions are described. Conditional Expression (1) defines a range of an average value of the anomalous partial dispersion ratios of optical materials used for the plurality of refractive optical elements having a refractive power in the same sign as that to the diffractive optical element Ldoe in the front unit LF (in each Example, refractive optical elements having a positive value) in the optical system L0. Meanwhile, Conditional Expression (2) similarly defines a range of an average value of the anomalous partial dispersion ratios of optical materials used for the plurality of refractive optical elements having a refractive power in a different sign from that of the diffractive optical element in the front unit LF (in each Example, refractive optical elements having a negative value) in the optical system of each Example.

In the following, $\delta\theta_{dC-fsi}$ and $\delta\theta_{dC-fdj}$ are collectively referred to as $\delta\theta_{dC}$. Further, $\theta_{dC-fsi}$ and $\theta_{dC-fdj}$ are collectively referred to as $\theta_{dC}$, and $\theta_{gd-fsi}$ and $\theta_{gd-fdj}$ are collectively referred to as $\theta_{gd}$.

When a graph taking $\theta_{dC}$ in the vertical axis and $\theta_{gd}$ in the lateral axis is considered and a range in which a general glass material is mainly distributed is approximated by a straight line of $\theta_{dC} = -0.1968 \times \theta_{gd} + 0.548$, $\delta\theta_{dC}$ in Conditional Expressions (1) and (2) represents a separation amount of $\theta_{dC}$ with respect to the straight line. As the value of Conditional Expression (1) is increased and the value of Conditional Expression (2) is decreased, good compatibility with the partial dispersion characteristic of the diffractive optical element is obtained from the viewpoint of correction of the chromatic aberration. Further, an achromatization effect is exerted particularly on the long wavelength side in the visible wavelength range.

When the value of Conditional Expression (1) exceeds the upper limit value thereof, the value of $\delta\theta_{dC}$ of the optical material used for the refractive optical element having the refractive power in the same sign (positive) as that of the diffractive optical element Ldoe in the front unit LF is increased too much, and thus the chromatic aberration caused in the refractive optical element is increased too much. In order to correct the chromatic aberration, the power of the diffractive surface of the diffractive optical element Ldoe is required to be increased. Along therewith, a grating pitch of the diffraction grating becomes too fine. In this case, flare due to the diffractive surface is increased, and the manufacturing becomes difficult, which is not preferred.

Meanwhile, when the value of Conditional Expression (1) falls below the lower limit value thereof, the value of $\delta\theta_{dC}$ of the optical material used for the refractive optical element having the refractive power in the same sign (positive) as that of the diffractive optical element Ldoe in the front unit LF is decreased too much. As a result, it becomes difficult to remove the chromatic aberration between the F-line and the C-line even with use of the diffractive optical element, which is not preferred.

Next, when the value of Conditional Expression (2) exceeds the upper limit value thereof, the value of $\delta\theta_{dC}$ of the optical material used for the refractive optical element having the refractive power in a different sign (negative) from that of the diffractive optical element Ldoe in the front unit LF is increased too much. As a result, it becomes difficult to remove the chromatic aberration between the F-line and the C-line even with use of the diffractive optical element Ldoe, which is not preferred. Meanwhile, when the value of Conditional Expression (2) falls below the lower limit value thereof, the value of $\delta\theta_{dC}$ of the optical material used for the refractive optical element having the refractive power in a different sign (negative) from that of the diffractive optical element Ldoe in the front unit LF is decreased too much. Along therewith, the chromatic aberration caused at the diffractive surface of the diffractive optical element Ldoe may not be sufficiently corrected, which is not preferred.

Further, it is desired that Conditional Expressions (1) and (2) fall within ranges of Conditional Expressions (1-a) and (2-a) given below, respectively, because, in the optical system according to the present invention, good compatibility with the partial dispersion characteristic of the diffractive optical element may be obtained and an achromatization effect may be exerted particularly on the long wavelength side in the visible wavelength range.

$$0.002 < \sum_{i=1}^{M} |\delta\theta_{dC-fsi}|/M < 0.008 \quad (1\text{-a})$$

$$0.000125 < \sum_{j=1}^{N} |\delta\theta_{dC-fdj}|/N < 0.000750 \quad (2\text{-a})$$

Further, Conditional Expressions (1-a) and (2-a) are desired to fall within ranges of Conditional Expressions (1-b) and (2-b) given below, respectively.

$$0.003 < \sum_{i=1}^{M} |\delta\theta_{dC-fsi}|/M < 0.006 \qquad (1\text{-b})$$

$$0.000150 < \sum_{j=1}^{N} |\delta\theta_{dC-fdj}|/N < 0.000500 \qquad (2\text{-b})$$

Satisfying Conditional Expression (3) while satisfying Conditional Expressions (1) and (2) is preferred in terms of correcting the chromatic aberration particularly on the long wavelength side in the visible wavelength range. In the optical system of each Example, the rear unit LR is formed of only refractive optical elements.

Conditional Expression (3) is a conditional expression for defining a ratio of a sum of coefficients of axial chromatic aberrations between the d-line and the C-line, which are caused in the plurality of refractive optical elements forming the rear unit LR, to a coefficient of an axial chromatic aberration between the d-line and the C-line, which is caused in the diffractive optical element Ldoe in the optical system. Conditional Expression (3) represents that the axial chromatic aberration caused in the diffractive optical element Ldoe is mainly corrected by the refractive optical elements of the rear unit LR. Conditional Expression (3) represents that, as the value of Conditional Expression (3) becomes closer to −1, the axial chromatic aberration caused in the diffractive optical element Ldoe is corrected by the refractive optical elements of the rear unit LR.

When the value of Conditional Expression (3) exceeds the upper limit value thereof, the absolute value of the sum of the coefficients of the axial chromatic aberrations caused in the rear unit LR formed of the refractive optical elements becomes too smaller than the coefficient of the axial chromatic aberration caused in the diffractive optical element Ldoe of the front unit LF. That is, it becomes difficult to correct the axial chromatic aberration caused in the diffractive optical element Ldoe of the front unit LF only by the axial chromatic aberration caused in the rear unit LR formed of the refractive optical elements.

In order to address this problem, the refractive power of the refractive optical element in the front unit LF, which has a larger effective diameter than that of the rear unit LR and thus tends to have a larger weight, is increased, or an optical material having an anomalous dispersion characteristic and a large specific gravity is used. Along therewith, the weight of the entire optical system is increased, which is not preferred.

Meanwhile, when the value of Conditional Expression (3) falls below the lower limit value thereof, the absolute value of the sum of the coefficients of the axial chromatic aberrations caused in the rear unit LR formed of the refractive optical elements tends to become larger than the coefficient of the axial chromatic aberration caused in the diffractive optical element Ldoe of the front unit LF. This means that the value of the axial chromatic aberration caused in the rear unit LR formed of the refractive optical elements and the value of the axial chromatic aberration caused in the diffractive optical element Ldoe of the front unit LF become close to each other in different signs, which is preferred in terms of correcting the axial chromatic aberration.

However, in order to achieve this state, the number of refractive optical elements made of the optical material having a desired optical characteristic is required to be increased in the rear unit LR in order to further increase the refractive power. The rear unit LR only has a little space for newly arranging the refractive optical elements, and hence this method is difficult and not preferred.

Further, Conditional Expression (3) is desired to fall within the range of Conditional Expression (3-a) given below from the viewpoint of satisfactorily correcting the axial chromatic aberration particularly on the long wavelength side in the visible wavelength range without increasing the weight of the front unit LF in the optical system.

$$-0.50 < \sum_{i=1}^{K} \frac{\phi_{bi}}{vd_{bi}} \delta\theta_{dC-bi} h_{Lbi}^2 \Big/ \frac{\phi_{DO}}{vd_{DO}} \delta\theta_{dC-DO} h_{DO}^2 < -0.02 \qquad (3\text{-a})$$

Further, Conditional Expression (3-a) is desired to fall within a range of Conditional Expression (3-b) given below.

$$-0.40 < \sum_{i=1}^{K} \frac{\phi_{bi}}{vd_{bi}} \delta\theta_{dC-bi} h_{Lbi}^2 \Big/ \frac{\phi_{DO}}{vd_{DO}} \delta\theta_{dC-DO} h_{DO}^2 < -0.03 \qquad (3\text{-b})$$

Conditional Expressions (4) and (5) are preferred in terms of correcting the chromatic aberration particularly on the short wavelength side in the visible wavelength range. Conditional Expressions (4) and (5) relate to, among the plurality of refractive optical elements in the front unit LF in the optical system, a refractive optical element having a refractive power in the same sign as that of the power of the diffractive surface of the diffractive optical element Ldoe and a refractive optical element having a refractive power in a different sign from that of the power of the diffractive surface of the diffractive optical element Ldoe, respectively.

Conditional Expression (4) is an expression for defining a range of the average value of the anomalous partial dispersion characteristics of the optical materials used for the plurality of refractive optical elements having a refractive power (positive value) in the same sign as that of the diffractive optical element Ldoe of the front unit LF in the optical system. Meanwhile, similarly, Conditional Expression (5) is an expression for defining a range of the average value of the anomalous partial dispersion characteristics of the optical materials used for the plurality of refractive optical elements having a refractive power (negative value) in a different sign from that of the diffractive optical element Ldoe of the front unit LF in the optical system.

In the following, $\Delta\theta_{gd\text{-}fsi}$ and $\Delta\theta_{gd\text{-}fdj}$ are collectively referred to as $\Delta\theta_{gd}$. Further, $\theta_{gd\text{-}fsi}$ and $\theta_{gd\text{-}fdj}$ are collectively referred to as $\theta_{gd}$, and $vd_{fsi}$ and $vd_{fdj}$ are collectively referred to as vd.

When a graph taking $\theta_{gd}$ in the vertical axis and vd in the lateral axis is considered and a range in which a general glass material is mainly distributed is approximated by a function of $\theta_{gd} = -1.687 \times 10^{-7} \times vd^3 + 5.702 \times 10^{-5} \times vd^2 - 6.603 \times 10^{-3} \times vd + 1.462$, $\Delta\theta_{gd}$ in each of Conditional Expressions (4) and (5) represents a separation amount of $\theta_{gd}$ with respect to the function.

As the value of Conditional Expression (4) is increased and the value of Conditional Expression (5) is decreased, good compatibility with the partial dispersion characteristic of the diffractive optical element Ldoe is obtained from the viewpoint of correction of the chromatic aberration. Further, an achromatization effect is exerted particularly on the short wavelength side in the visible wavelength range.

When the value of Conditional Expression (4) exceeds the upper limit value thereof, the value of Δθgd of the optical material used for the refractive optical element having the refractive power in the same sign (positive) as that of the diffractive optical element Ldoe in the front unit LF is increased too much, and thus the chromatic aberration caused in the refractive optical element is increased too much. In order to correct the chromatic aberration, the power of the diffractive surface of the diffractive optical element Ldoe is required to be increased. Along therewith, a grating pitch of the diffraction grating becomes too fine. In this case, flare due to the diffractive surface is increased, and the manufacturing becomes difficult.

Meanwhile, when the value of Conditional Expression (4) falls below the lower limit value thereof, the value of $\Delta\theta_{gd}$ of the optical material used for the refractive optical element having the refractive power in the same sign (positive) as that of the diffractive optical element Ldoe in the front unit LF is decreased too much. As a result, it becomes difficult to remove the chromatic aberration between the g-line and the d-line even with use of the diffractive optical element, which is not preferred.

Next, when the value of Conditional Expression (5) exceeds the upper limit value thereof, the value of $\Delta\theta_{gd}$ of the optical material used for the refractive optical element having the refractive power in a different sign (negative) from that of the diffractive optical element Ldoe in the front unit LF is increased too much. As a result, it becomes difficult to remove the chromatic aberration between the g-line and the d-line even with use of the diffractive optical element Ldoe, which is not preferred.

Meanwhile, when the value of Conditional Expression (5) falls below the lower limit value thereof, the chromatic aberration caused in the refractive optical element is increased too much. In order to correct the chromatic aberration, the power of the diffractive surface of the diffractive optical element Ldoe is required to be increased. Along therewith, a grating pitch of the diffraction grating becomes too fine. In this case, flare due to the diffractive surface is increased, and the manufacturing becomes difficult, which is not preferred.

Further, it is desired that ranges of the numerical values of Conditional Expressions (4) and (5) fall within ranges of Conditional Expressions (4-a) and (5-a) given below, respectively, because good compatibility with the partial dispersion characteristic of the diffractive optical element Ldoe may be obtained and an achromatization effect may be exerted particularly on the short wavelength side in the visible wavelength range.

$$0.02 < \sum_{i=1}^{M} |\Delta\theta_{gd-fsi}|M < 0.08 \quad (4\text{-a})$$

$$0.002 < \sum_{j=1}^{N} |\Delta\theta_{gd-fdj}|N < 0.008 \quad (5\text{-a})$$

Further, Conditional Expressions (4-a) and (5-a) are desired to fall within ranges of Conditional Expressions (4-b) and (5-b) given below, respectively.

$$0.03 < \sum_{i=1}^{M} |\Delta\theta_{gd-fsi}|M < 0.06 \quad (4\text{-b})$$

$$0.003 < \sum_{j=1}^{N} |\Delta\theta_{gd-fdj}|N < 0.006 \quad (5\text{-b})$$

Conditional Expression (6) is preferred in terms of correcting the chromatic aberration particularly on the short wavelength side in the visible wavelength range.

Conditional Expression (6) is a conditional expression for defining a ratio of a sum of coefficients of axial chromatic aberrations between the g-line and the d-line, which are caused in the plurality of refractive optical elements forming the rear unit LR, to a coefficient of an axial chromatic aberration between the g-line and the d-line, which is caused in the diffractive optical element Ldoe in the optical system of the present invention. Conditional Expression (6) represents that the axial chromatic aberration caused in the diffractive optical element Ldoe is mainly corrected by the refractive optical elements of the rear unit LR. Conditional Expression (6) represents that, as the value of Conditional Expression (6) becomes closer to −1, the axial chromatic aberration caused in the diffractive optical element Ldoe is corrected by the refractive optical elements of the rear unit LR.

When the value of Conditional Expression (6) exceeds the upper limit value thereof, the coefficients of the axial chromatic aberrations caused in the rear unit LR formed of the refractive optical elements become too smaller than the coefficient of the axial chromatic aberration caused in the diffractive optical element Ldoe of the front unit LF. Along therewith, the axial chromatic aberration caused in the diffractive optical element Ldoe cannot be satisfactorily corrected only by the axial chromatic aberration caused in the rear unit LR formed of the refractive optical elements. In order to address this problem, the refractive power of the refractive optical element in the front unit LF, which has a larger effective diameter than that of the rear unit LR and thus tends to have a larger weight, is increased, or an optical material having an anomalous dispersion characteristic and a large specific gravity is used. Along therewith, the weight of the entire optical system is increased, which is not preferred.

Meanwhile, when the value of Conditional Expression (6) falls below the lower limit value thereof, the coefficients of the axial chromatic aberrations caused in the rear unit LR formed of the refractive optical elements tend to become larger than the coefficient of the axial chromatic aberration caused in the diffractive optical element Ldoe of the front unit LF. This means that, along with this, the value of the axial chromatic aberration caused in the rear unit LR formed of the refractive optical elements and the value of the axial chromatic aberration caused in the diffractive optical element Ldoe of the front unit LF become close to each other in different signs, which is preferred in terms of correcting the axial chromatic aberration.

However, in order to achieve this state, the number of refractive optical elements made of the optical material having a desired optical characteristic is required to be increased in the rear unit LR in order to further increase the refractive power. The rear unit LR only has a little space for newly arranging the refractive optical elements, and hence this method is difficult.

Further, the range of the numerical value of Conditional Expression (6) is desired to fall within a range of Conditional Expression (6-a) given below from the viewpoint of satisfactorily correcting the axial chromatic aberration particularly on the short wavelength side in the visible wavelength range without increasing the weight of the front unit LF.

$$-0.090 < \sum_{i=1}^{K} \frac{\phi_{bi}}{vd_{bi}} \Delta\theta_{gd-bi} h_{bi}^2 \Big/ \frac{\phi_{DO}}{vd_{DO}} \Delta\theta_{gd-DO} h_{DO}^2 < -0.0075 \quad (6\text{-a})$$

Further, Conditional Expression (6-a) is desired to fall within a range of Conditional Expression (6-b) given below.

$$-0.08 < \sum_{i=1}^{K} \frac{\phi_{bi}}{vd_{bi}} \Delta\theta_{gd-bi} h_{bi}^2 \Big/ \frac{\phi_{DO}}{vd_{DO}} \Delta\theta_{gd-DO} h_{DO}^2 < -0.01 \quad (6\text{-b})$$

Conditional Expressions (7) and (8) are expressions for satisfactorily correcting a lateral chromatic aberration in the entire visible wavelength range. Conditional Expression (7) defines a ratio of a sum of coefficients of lateral chromatic aberrations between the d-line and the C-line, which are caused in the plurality of refractive optical elements forming the rear unit LR in the optical system, to a coefficient of a lateral chromatic aberration between the d-line and the C-line, which is caused in the diffractive optical element Ldoe. Meanwhile, Conditional Expression (8) defines a ratio of a sum of coefficients of lateral chromatic aberrations between the g-line and the d-line, which are caused in the plurality of refractive optical elements forming the rear unit LR in the optical system, to a coefficient of a lateral chromatic aberration between the g-line and the d-line, which is caused in the diffractive optical element Ldoe.

Conditional Expressions (7) and (8) mean that, as the absolute value of each conditional expression becomes closer to 1, the lateral chromatic aberration caused in the diffractive optical element Ldoe is corrected by the lateral chromatic aberration caused in the rear unit LR. When the value of Conditional Expression (7) exceeds the upper limit value thereof, the coefficient of the lateral chromatic aberration between the d-line and the C-line, which is caused in the rear unit LR formed of the refractive optical elements, becomes too smaller than the coefficient of the lateral chromatic aberration between the d-line and the C-line, which is caused in the diffractive optical element Ldoe of the front unit LF. Along therewith, the lateral chromatic aberration between the d-line and the C-line, which is caused in the diffractive optical element Ldoe, may not be sufficiently corrected only by the lateral chromatic aberration between the d-line and the C-line, which is caused in the rear unit LR formed of the refractive optical elements.

In order to address this problem, the refractive power of the refractive optical element in the front unit LF, which has a larger effective diameter than that of the rear unit LR and thus tends to have a larger weight, is increased, or an optical material having an anomalous dispersion characteristic and a large specific gravity is used. Along therewith, the weight of the entire optical system is increased, which is not preferred.

Meanwhile, when the value of Conditional Expression (7) falls below the lower limit value thereof, the coefficient of the lateral chromatic aberration between the d-line and the C-line, which is caused in the rear unit LR formed of the refractive optical elements, tends to become larger than the coefficient of the lateral chromatic aberration between the d-line and the C-line, which is caused in the diffractive optical element Ldoe of the front unit LF. This means that, along therewith, the value of the lateral chromatic aberration between the d-line and the C-line, which is caused in the rear unit LR formed of the refractive optical elements, and the value of the lateral chromatic aberration between the d-line and the C-line, which is caused in the diffractive optical element Ldoe of the front unit LF, become close to each other in different signs, which is preferred in terms of correcting the lateral chromatic aberration.

However, in order to achieve this state, the number of refractive optical elements made of the optical material having a desired optical characteristic is required to be increased in the rear unit LR in order to further increase the refractive power. The rear unit LR only has a little space for newly arranging the refractive optical elements, and hence this method is difficult.

Next, when the value of Conditional Expression (8) exceeds the upper limit value thereof, the coefficient of the lateral chromatic aberration between the g-line and the d-line, which is caused in the rear unit LR formed of the refractive optical elements, tends to become larger than the coefficient of the lateral chromatic aberration between the g-line and the d-line, which is caused in the diffractive optical element Ldoe of the front unit LF. This means that, along therewith, the value of the lateral chromatic aberration between the g-line and the d-line, which is caused in the rear unit LR formed of the refractive optical elements, and the value of the lateral chromatic aberration between the g-line and the d-line, which is caused in the diffractive optical element Ldoe of the front unit LF, become close to each other, which is preferred in terms of correcting the lateral chromatic aberration.

However, in order to achieve this state, the number of refractive optical elements made of the optical material having a desired optical characteristic is required to be increased in the rear unit LR in order to further increase the refractive power. The rear unit LR only has a little space for newly arranging the refractive optical elements, and hence this method is difficult.

Meanwhile, when the value of Conditional Expression (8) falls below the lower limit value thereof, the coefficient of the lateral chromatic aberration between the g-line and the d-line, which is caused in the rear unit LR formed of the refractive optical elements, becomes too smaller than the coefficient of the lateral chromatic aberration between the g-line and the d-line, which is caused in the diffractive optical element Ldoe of the front unit LF. Along therewith, the lateral chromatic aberration between the g-line and the d-line, which is caused in the diffractive optical element Ldoe, cannot be satisfactorily corrected only by the lateral chromatic aberration between the g-line and the d-line, which is caused in the rear unit LR formed of the refractive optical elements.

In order to address this problem, the refractive power of the refractive optical element in the front unit LF, which has a larger effective diameter than that of the rear unit LR and thus tends to have a larger weight, is increased, or an optical material having an anomalous dispersion characteristic and a large specific gravity is used. Along therewith, the weight of the entire optical system is increased, which is not preferred.

Further, ranges of numerical values of Conditional Expressions (7) and (8) are desired to fall within ranges of Conditional Expressions (7-a) and (8-a) given below, respectively, from the viewpoint of satisfactorily correcting the lateral chromatic aberration in the entire visible wavelength range without increasing the weight of the front unit LF.

$$-0.800 < \sum_{i=1}^{K} \frac{\phi_{bi}}{vd_{bi}} \delta\theta_{dC-bi} h_{bi} \bar{h}_{bi} \Big/ \frac{\phi_{DO}}{vd_{DO}} \delta\theta_{dC-DO} h_{DO} \bar{h}_{DO} < -0.075 \quad (7\text{-}a)$$

$$0.075 < \sum_{i=1}^{K} \frac{\phi_{bi}}{vd_{bi}} \Delta\theta_{gd-bi} h_{bi} \bar{h}_{bi} \Big/ \frac{\phi_{DO}}{vd_{DO}} \Delta\theta_{gd-DO} h_{DO} \bar{h}_{DO} < 0.800 \quad (8\text{-}a)$$

Further, Conditional Expressions (7-a) and (8-a) are desired to fall within ranges of Conditional Expressions (7-b) and (8-b) given below, respectively.

$$-0.60 < \sum_{i=1}^{K} \frac{\phi_{bi}}{vd_{bi}} \delta\theta_{dC-bi} h_{bi} \bar{h}_{bi} \Big/ \frac{\phi_{DO}}{vd_{DO}} \delta\theta_{dC-DO} h_{DO} \bar{h}_{DO} < -0.10 \quad (7\text{-}b)$$

$$0.10 < \sum_{i=1}^{K} \frac{\phi_{bi}}{vd_{bi}} \Delta\theta_{gd-bi} h_{bi} \bar{h}_{bi} \Big/ \frac{\phi_{DO}}{vd_{DO}} \Delta\theta_{gd-DO} h_{DO} \bar{h}_{DO} < 0.60 \quad (8\text{-}b)$$

Conditional Expression (9) is preferred in terms of achieving reduction in weight in the entire optical system while the axial chromatic aberration and the lateral chromatic aberration are satisfactorily corrected. Conditional Expression (9) defines a length on the optical axis at a position at which the refractive optical elements in the front unit LF have a largest length therebetween on the optical axis.

Conditional Expression (9) relates to a refractive optical element being a lens that is closer to the object side in the front unit LF, which accounts for particularly a large percentage of weight in the front unit LF accounting for the majority of the weight in the optical system. When weight reduction is considered, weight is proportional to volume, and hence the size in the direction of the effective diameter, which becomes apparent in the squared term, is particularly important. Thus, reduction of the effective diameter by increasing the interval on the optical axis between the target refractive optical elements is an effective measure in terms of reducing the weight.

When the value of Conditional Expression (9) exceeds the upper limit value thereof, a length on the optical axis at a position at which, among the refractive optical elements in the front unit LF, the refractive optical elements have the largest length therebetween on the optical axis is increased too much with respect to the total lens length of the entire optical system. This means that the respective refractive optical elements playing an important role in correcting the axial chromatic aberration and the lateral chromatic aberration are arranged closer to the image side. Along therewith, correction of the axial chromatic aberration and the lateral chromatic aberration in the entire optical system becomes difficult, which is not preferred.

Meanwhile, when the value of Conditional Expression (9) falls below the lower limit value thereof, a length on the optical axis at the position at which, among the refractive optical elements in the front unit LF, the refractive optical elements have the largest length therebetween on the optical axis is decreased too much with respect to the total lens length of the entire optical system. This means that the respective refractive optical elements are arranged closer to the object side. Thus, the effective diameter is increased, and the volume is increased, that is, the weight tends to increase, which is not preferred.

Further, the range of the numerical value of Conditional Expression (9) is desired to fall within a range of Conditional Expression (9-a) given below from the viewpoint of reducing the weight of the entire optical system while satisfactorily correcting various aberrations such as the axial and lateral chromatic aberrations and the spherical aberration.

$$0.075 < L_{ff}/L_{TOT} < 0.400 \quad (9\text{-}a)$$

Further, Conditional Expression (9-a) is desired to fall within a range of Conditional Expression (9-b) given below.

$$0.100 < L_{ff}/L_{TOT} < 0.300 \quad (9\text{-}b)$$

Next, other features of the optical system according to the present invention are described. First, in the optical system according to the present invention, the front unit LF includes the first lens unit L1, which has a positive refractive power, and the second lens unit L2, which has a negative refractive power, and is configured to move in the optical axis direction along with the change in focus from the object at infinity to the object in close proximity. The rear unit LR includes the third lens unit L3 having a negative refractive power. Further, the first lens unit L1 includes the diffractive optical element Ldoe having a positive refractive power and an aspheric surface. With such a lens configuration, it is possible to easily obtain an optical system in which various aberrations such as axial and lateral chromatic aberrations and a spherical aberration are satisfactorily corrected from the object at infinity to the object in close proximity.

The diffractive surface of the diffractive optical element Ldoe is formed at the cemented surface of the cemented lens formed of optical members each made of a glass material or optical members each made of a resin material having a thickness of 0.1 mm or less on the optical axis. Basically, the optical material used for the refractive optical element in the first lens unit L1 is a glass material, but only a portion at which the diffractive surface of the diffractive optical element Ldoe is formed is made of a thin resin material having a thickness of 0.1 mm or less on the optical axis. This state is employed in order to set the diffraction efficiency in the diffractive optical element Ldoe to a high value over the entire visible wavelength range as described later, and almost no effect is exerted in terms of chromatic aberration correction.

Next, the specific gravity of the optical material used for the refractive optical element of the first lens unit L1 is preferred to be 3.5 or less. The specific gravity of the material in this case is a ratio between the mass of a material used for the lens at normal temperature (15° C. to 25° C.) and the mass of pure water of 4° C., which has the same volume as that of the material, under the pressure of 101.325 kPa (standard atmosphere). The refractive optical element in the first lens unit L1 uses a relatively light optical material having a specific gravity of 3.5 or less. Thus, the weight of the first lens unit L1 is easily reduced.

The third lens unit L3 is preferred to have at least one aspheric surface. When the aspheric surface is used in the third lens unit L3, various aberrations such as a spherical aberration, a coma, and an astigmatism, which are caused in the entire optical system, are easily corrected. It is preferred that a value (=telephoto ratio) obtained by dividing the length on the optical axis from a lens surface closest to the object side to the image pickup surface by a focal length of the entire optical system when focused on the object at infinity be 0.7 or less. Thus, a small-sized optical system having a telephoto ratio of 0.7 is achieved while satisfactorily correcting various aberrations such as axial and lateral chromatic aberrations and a spherical aberration.

The optical system according to the present invention is a super-telephoto optical system having a fixed focal length. In each Example, the focal length is 585 mm, an F-number (Fno) is 4.12, and the telephoto ratio is 0.7 or less. In the lens cross-sectional diagrams, the front unit LF, the aperture stop S, and the rear unit LR are illustrated. The front unit LF and the rear unit LR are arranged on the object side and the image side, respectively, from the aperture stop S. Further, the front unit LF includes the first lens unit L1 having a positive refractive power and the second lens unit L2 having a negative refractive power. The rear unit LR includes the third lens unit L3 having a negative refractive power.

Further, with the change in focus from the object at infinity to the object in close proximity, a focus lens unit Lfo formed of the second lens unit L2 is moved along the optical axis to the image plane side. The image stabilizing lens unit (LIS) being the lens unit in the third lens unit L3 is moved so as to have a component in a direction perpendicular to the optical axis O. Thus, image blur due to hand shake or the like is corrected.

EXAMPLE 1

The optical system L0 according to Example 1 has a focal length of 585 mm, an F-number of 4.12, and a telephoto ratio of 0.57. The diffractive optical element Ldoe is formed of a cemented lens being a fourth lens counted from the object side, and the diffractive surface is formed at the cemented lens surface of the cemented lens. The reason why the diffractive surface is formed at this position is based on such viewpoints that light outside the image-pickup angle of view, which is originally unnecessary for taking an image, is less likely to directly impinge the diffractive surface and an effect can be exerted for correction of the axial chromatic aberration and the lateral chromatic aberration. Further, there are one aspheric surface "asph" in the first lens unit L1 and two aspheric surfaces "asph" in the third lens unit L3.

In a small-sized optical system having a telephoto ratio of 0.57, not only the chromatic aberration but also various aberrations such as a spherical aberration, a coma, and an astigmatism are increased. In order to satisfactorily correct the various aberrations, three aspheric surfaces are formed. Specifically, the one aspheric surface in the first lens unit L1 mainly corrects the spherical aberration, and the two aspheric surfaces in the third lens unit L3 mainly correct the coma and the astigmatism.

The optical system according to Example 1 satisfactorily satisfies Conditional Expressions (1) to (9) described above. Thus, the chromatic aberration is satisfactorily corrected over the entire visible wavelength range, and the entire optical system is reduced in size and weight.

EXAMPLE 2

The optical system L0 according to Example 2 has a focal length of 585 mm, an F-number of 4.12, and a telephoto ratio of 0.57. The diffractive optical element Ldoe is formed of a positive lens closest to the object side, and the diffractive surface is formed on the optical surface of the positive lens on the image side. The reason why the diffractive surface is formed at this position is because this position is most effective for satisfactorily correcting mainly the axial chromatic aberration and the lateral chromatic aberration. Along therewith, in Example 2, the third positive lens arranged from the object side in Example 1 of FIG. 1 can be omitted. Further, the aspheric surfaces are arranged at substantially the same position as that of Example 1. The reason for this arrangement is the same as that of Example 1.

Similarly to Example 1, the optical system according to Example 2 well satisfies Conditional Expressions (1) to (9) described above. Thus, the chromatic aberration is satisfactorily corrected over the entire visible wavelength range, and the entire optical system is reduced in size and weight.

EXAMPLE 3

The optical system L0 according to Example 3 of the present invention has a focal length of 585 mm, an F-number of 4.12, and a telephoto ratio of 0.61. Similarly to Example 1, the diffractive optical element Ldoe is formed of a cemented lens being a fourth lens counted from the object side, and the diffractive surface is formed at the cemented lens surface of the cemented lens. The reason why the diffractive surface is formed at this position is the same as that of Example 1. Further, the aspheric surfaces "asph" are arranged at the same position as that of Example 1, and the reason for this arrangement is the same as that of Example 1. The difference from Example 1 resides in the total lens length of the entire optical system and the configuration of the lens closest to the image side in the rear unit LR.

Similarly to Examples 1 and 2, the optical system according to Example 3 well satisfies Conditional Expressions (1) to (9) described above. Thus, the chromatic aberration is satisfactorily corrected over the entire visible wavelength range, and the entire optical system is reduced in size and weight.

Examples of the present invention are described above, but the present invention is not limited thereto as long as Conditional Expressions (1) to (9) described above are well satisfied and the lens structure is appropriate. The diffraction optical element is provided on the optical surface, but a curvature radius of the optical surface may correspond to that of a spherical surface, a flat surface, or an aspheric surface.

As a method of manufacturing the diffractive optical element in each of Examples, a method of directly forming a binary optics shape on a lens surface by using a photoresist can be applied. As another example, a method of performing replica formation or molding formation using a mold formed in the method using the photoresist can be applied. When a kinoform having a sawtooth shape is provided, diffraction efficiency is improved, and hence diffraction efficiency close to an ideal value may be expected.

Next, a structure of the diffractive optical element used in the optical system according to the present invention is described. Applicable examples of the structure of the diffractive optical element include a two-layered structure illustrated in FIG. 7A in which an air layer is sandwiched, a three-layered structure illustrated in FIG. 7B in which the air layer is sandwiched, and a cemented two-layer structure illustrated in FIG. 7C in which two layers having the same grating thickness are brought into intimate contact with each other.

Figure 7A:
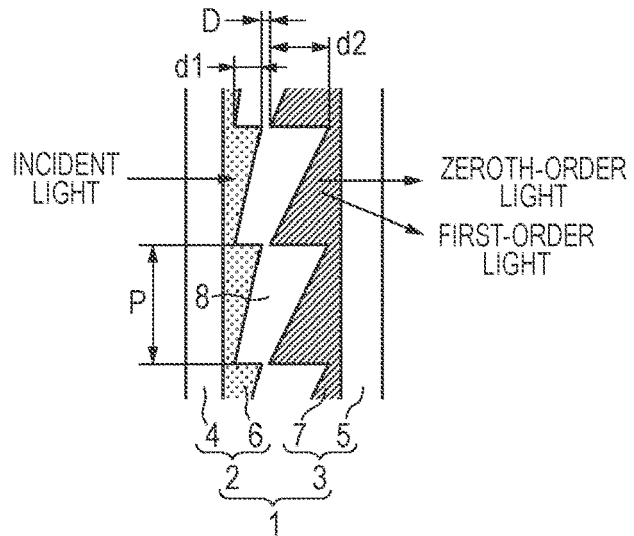
FIG. 7A is an explanatory diagram of a diffractive optical element of the present invention.

In FIG. 7A, a first diffraction grating 6 made of an ultraviolet curable resin is formed on a base 4, to thereby serve as a first diffractive optical portion 2. A second diffraction grating 7 made of an ultraviolet curable resin different from the ultraviolet curable resin of the first diffraction grating 6 is formed on another base 5, to thereby serve as a second diffractive optical portion 3. The first diffractive optical portion 2 and the second diffractive optical portion 3 are arranged close to each other through an air layer 8 at an interval D. The two diffraction gratings 6 and 7 act as a single diffractive optical element 1.

In this case, a grating thickness of the first diffraction grating 6 is represented by d1 and a grating thickness of the second diffraction grating 7 is represented by d2. With respect to the grating direction, the grating thickness of the first diffraction grating 6 monotonously decreases in the direction from top to bottom. In contrast to this, the grating thickness of the second diffraction grating 7 monotonously increases in the direction from top to bottom. When incident light enters the diffractive optical element from the left side as illustrated in FIG. 7A, light traveling in a right oblique downward direction is first-order light, and light traveling in a straight direction is zeroth-order light.

Figure 8A:
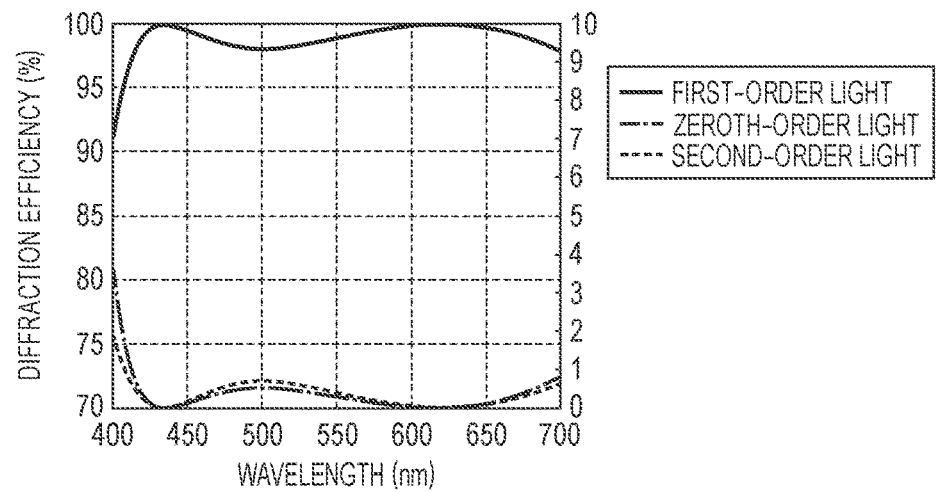
FIG. 8A is a graph for showing a wavelength dependence characteristic of a diffraction efficiency of the diffractive optical element in the present invention.

In FIG. 8A, there are shown wavelength dependence characteristics of diffraction efficiencies with respect to first-order diffraction light corresponding to the design order and zeroth-order diffraction light and second-order diffraction light, which correspond to "(design order)±1", in the diffractive optical element 1 having the two-layered structure as illustrated in FIG. 7A. In the structure of the diffractive optical element 1, with respect to a material of the first diffraction grating 6, nd1=1.636 and νd1=22.8. The grating thickness d1 is equal to 7.88 μm. With respect to a material of the second diffraction grating 7, nd2=1.524 and νd2=51.6. The grating thickness d2 is equal to 10.71 μm. An air interval D1 is equal to 1.5 μm.

Further, a grating pitch P illustrated in FIG. 7A is equal to 200 μm. As is apparent from FIG. 8A, diffraction efficiency of the design order light (first-order light) is a high value equal to or larger than approximately 90% over the entire use wavelength region. Diffraction efficiency of the unnecessary diffraction order light (zeroth-order light and second-order light) is suppressed to a value equal to or smaller than approximately 5% over the entire use wavelength region.

Figure 7B:
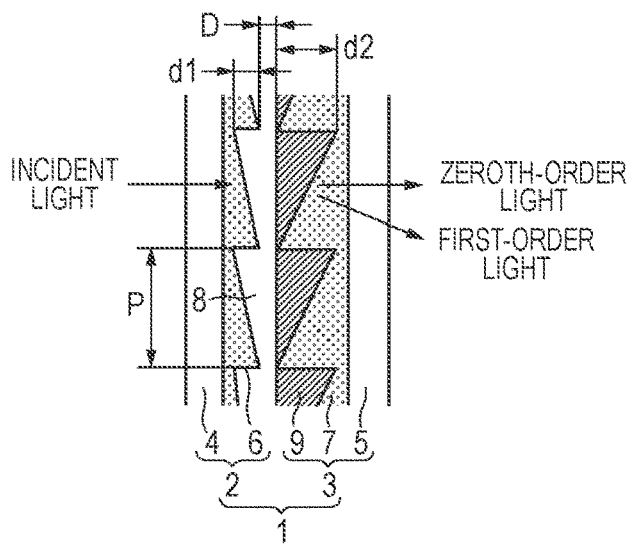
FIG. 7B is an explanatory diagram of the diffractive optical element of the present invention.

In the structure illustrated in FIG. 7B, the first diffraction grating 6 made of an ultraviolet curable resin is formed on the base 4 to thereby serve as a first diffractive optical portion 2, and the second diffraction grating 7 made of the same ultraviolet curable resin as that of the first diffraction grating 6 is formed on the another base 5 and buried in a different ultraviolet curable resin 9, to thereby serve as the second diffractive optical portion 3. The first diffraction grating 6 and the second diffraction grating 7 are arranged close to each another through the air layer 8 at the interval D. The two diffraction gratings 6 and 7 act as a single diffractive optical element 1.

In this case, the grating thickness of the first diffraction grating 6 is represented by d1, and the grating thickness of the second diffraction grating 7 is represented by d2. With respect to the grating direction, the grating thicknesses of the first diffraction grating 6 and the second diffraction grating 7 monotonously increase in the direction from top to bottom. When incident light enters the diffractive optical element from the left side as illustrated in FIG. 7B, light traveling in the right oblique downward direction is first-order light and light traveling in the straight direction is zeroth-order light.

Figure 8B:
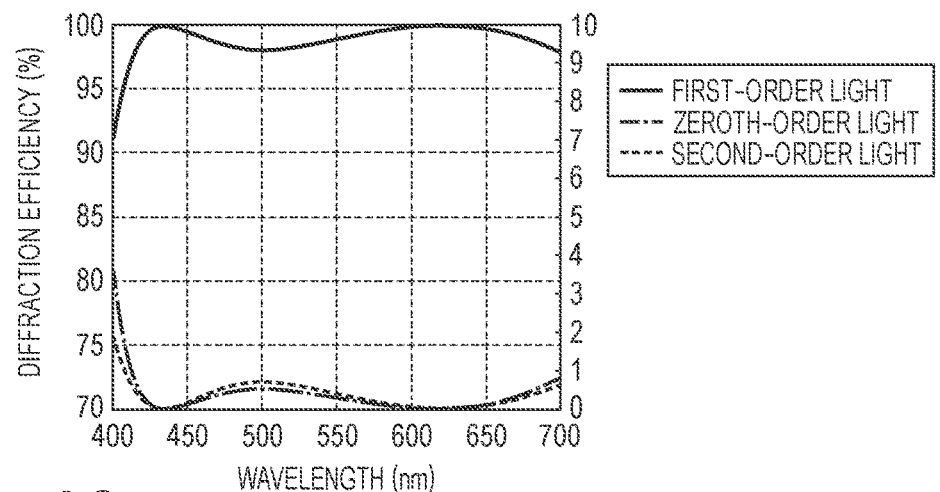
FIG. 8B is a graph for showing the wavelength dependence characteristic of the diffraction efficiency of the diffractive optical element in the present invention.

In FIG. 8B, there are shown wavelength dependence characteristics of diffraction efficiencies with respect to the first-order diffraction light corresponding to the design order and the zeroth-order diffraction light and the second-order diffraction light, which correspond to "(design order)±1", in the diffractive optical element 1 having the three-layered structure as illustrated in FIG. 7B. In the structure of the diffractive optical element 1, with respect to a material of the first diffraction grating 6, nd1=1.636 and νd1=22.8. The grating thickness d1 is equal to 2.83 μm. With respect to a material of the second diffraction grating 7, nd2-1=1.524, νd2-1=51.6, nd2-2=1.636, and νd2-2=22.8. The grating thickness d2 is equal to 7.88 μm. The air interval D is equal to 1.5 μm.

Further, the grating pitch P illustrated in FIG. 7B is equal to 200 μm. As is apparent from FIG. 8B, as in the case of FIG. 8A, diffraction efficiency of the design order light (first-order light) is a high value equal to or larger than approximately 90% over the entire use wavelength region. Diffraction efficiency of the unnecessary diffraction order light (zeroth-order light and second-order light) is suppressed to a value equal to or smaller than approximately 5% over the entire use wavelength region.

Figure 7C:
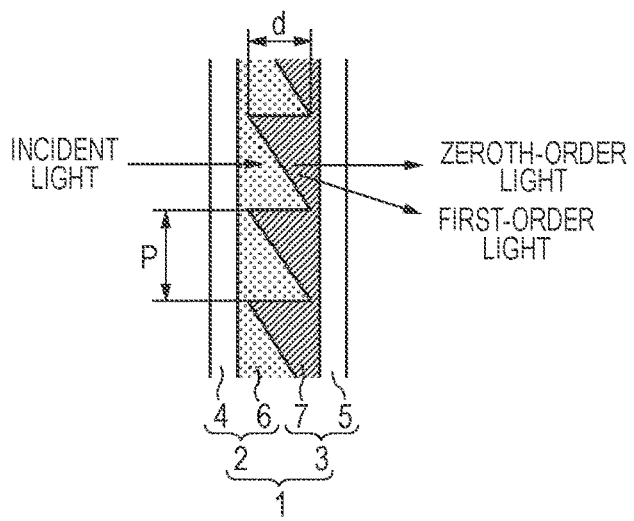
FIG. 7C is an explanatory diagram of the diffractive optical element of the present invention.

In the structure illustrated in FIG. 7C, the first diffraction grating 6 made of an ultraviolet curable resin is formed on the base 4, the second diffraction grating 7 made of an ultraviolet curable resin different from that of the first diffraction grating 6 is formed on the another base 5, and the first diffraction grating 6 and the second diffraction grating 7 are brought into intimate contact to each other at the same grating thickness d1. The two diffraction gratings 6 and 7 act as the single diffractive optical element 1.

With respect to the grating direction, the grating thickness of the first diffraction grating 6 monotonously increases in the direction from top to bottom. In contrast to this, the grating thickness of the second diffraction grating 7 monotonously decreases in the direction from top to bottom. When incident light enters the diffractive optical element from the left side as illustrated in FIG. 7C, light traveling in the right oblique downward direction is first-order light and light traveling in the straight direction is zeroth-order light.

Figure 8C:
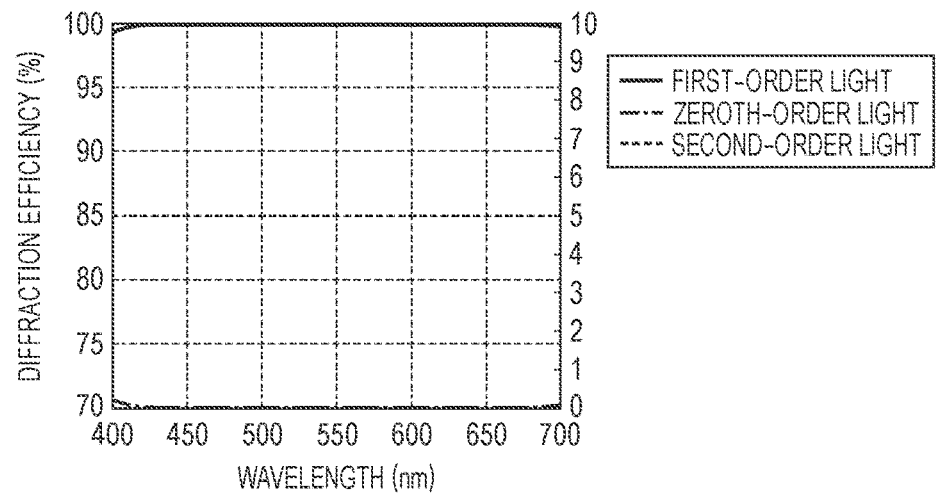
FIG. 8C is a graph for showing the wavelength dependence characteristic of the diffraction efficiency of the diffractive optical element in the present invention.

In FIG. 8C, there are shown wavelength dependence characteristics of diffraction efficiencies with respect to the first-order diffraction light corresponding to the design order and the zeroth-order diffraction light and the second-order diffraction light, which correspond to "(design order)±1", in the diffractive optical element 1 having the cemented two-layer structure as illustrated in FIG. 7C. In the structure of the diffractive optical element 1, with respect to a material of the first diffraction grating 6, nd1=1.620 and νd1=43.0. With respect to a material of the second diffraction grating 7, nd2=1.567 and νd2=19.4. The diffraction gratings 6 and 7 have the same grating thickness d, which is equal to 11.5 μm. The grating pitch P illustrated in FIG. 7C is equal to 200 μm.

As is apparent from FIG. 8C, diffraction efficiency of the design order light (first-order light) is a high value equal to or larger than approximately 99.5% over the entire use wavelength region, which is significantly higher than those in the case of FIG. 8A and FIG. 8B. Diffraction efficiency of the unnecessary diffraction order light (zeroth-order light and second-order light) is also significantly suppressed to a value equal to or smaller than approximately 0.05% over the entire use wavelength region. As described above, the diffractive optical elements used in the respective Examples are described. However, as long as the fundamental performance including the diffraction efficiency is equal to or higher than the performance of the diffraction optical elements described above, the present invention is not limited to the diffractive optical elements described above.

Figure 9:
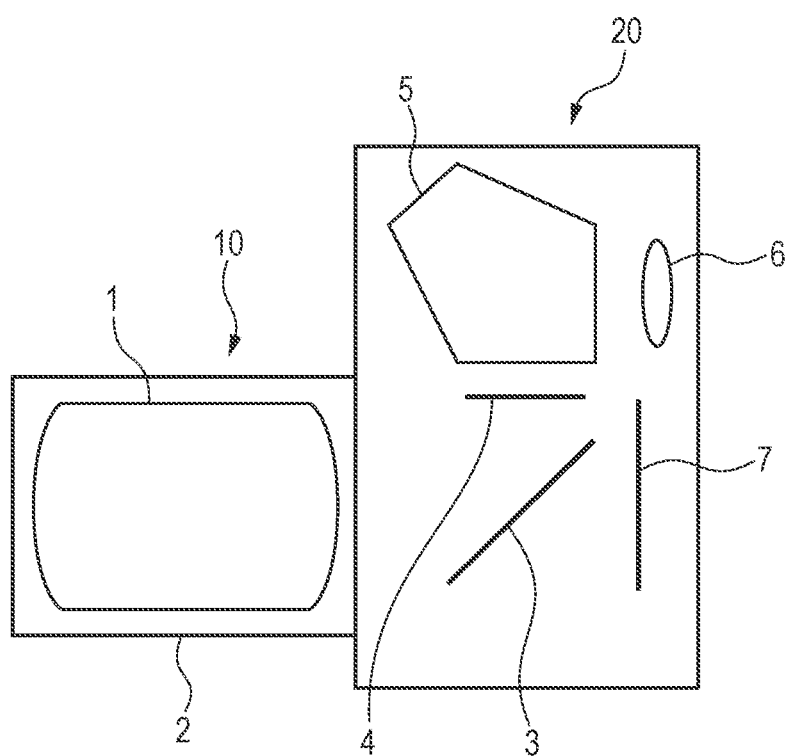
FIG. 9 is a schematic diagram of a main part of an image pickup apparatus according to the present invention.

Next, Example in which the optical system according to the present invention is applied to an image pickup apparatus (camera system) is described referring to FIG. 9. FIG. 9 is a schematic diagram of a main part of a single-lens reflex camera.

In FIG. 9, an image pickup lens 10 includes an optical system 1 of any one of Examples 1 to 3. The optical system 1 is held by a lens barrel 2, which is a holder member. A camera main body 20 includes a quick return mirror 3 configured to reflect a light flux from the image pickup lens 10 upward, a focusing screen 4 located at an image formation position of an image formed by the image pickup lens 10, and a penta-dach prism 5 configured to convert an inverse image formed on the focusing screen 4 into an erected image. The camera main body 20 further includes an eyepiece lens 6 configured to observe the erected image and the like.

On a photosensitive surface 7, an image pickup element (photoelectric conversion element) (image pickup portion), such as a CCD sensor or a CMOS sensor, or a silver-halide film, which is configured to receive light of an image, are provided. At the time of photographing, the quick return mirror 3 retracts from an optical path such that an image is formed by the image pickup lens 10 on the photosensitive surface 7. In this manner, by applying the optical system according to Examples 1 to 3 to an image pickup apparatus such as a photographing camera, a video camera, or a digital still camera, the image pickup apparatus that is small in weight and has excellent optical characteristics is achieved.

In this Example, the optical system of the present invention can be similarly applied to a mirrorless camera without a quick return mirror.

Now, Numerical Data 1 to 3 corresponding to Examples 1 to 3 of the present invention, respectively, are described. In each of Numerical Data, i indicates the order of a surface counted from the object side, ri is a curvature radius of the i-th surface counted from the object side, di is an interval between the i-th surface and an (i+1)-th surface counted from the object side, ndi and vdi are a refractive index and an Abbe number of an optical member arranged between the i-th surface and the (i+1)-th surface, respectively. Further, the effective diameter of each surface is also shown.

Further, each Numerical Data shows the focal length, the F-number, the half angle of view (degree), the image height, and the total lens length. Further, a back focus (BF) is an air-equivalent distance from a final lens surface to the image plane. The total lens length is a value obtained by adding the back focus to a distance from the first lens surface to the final lens surface. In each Numerical Data, two surfaces closest to the image side correspond to the glass block, for example, a filter. Numerical values are those obtained when focus is at infinity. Further, when a displacement amount from the surface vertex in the optical-axis direction is represented by X, a height from the optical axis in a direction perpendicular to the optical axis is represented by "h", a paraxial curvature radius is represented by R, a conic constant is represented by "k", and the aspheric surface coefficients of the respective orders are represented by A1, A2, A3, A4, ..., the shape of the aspheric surface is represented by Expression (B).

$$X(r) = \frac{(1/R)h^2}{1+\sqrt{1-(1+k)(h/R)^2}} + A1h^4 + A2h^6 + A3h^8 + A4h^{10} + \ldots \quad (B)$$

When a diffraction order of diffraction light is represented by "m", a design wavelength is represented by $\Delta 0$, a height in a direction perpendicular to the optical axis is represented by "h", and a phase coefficient is represented by Ci (i=1, 2, 3 ...), a phase function ψ of the diffraction optical surface in each Example is expressed by the following expression.

$$\psi(h,m) = (2\Pi/m\lambda 0) \times (C1 \cdot h^2 + C2 \cdot h^4 + C3 \cdot h^6 + \ldots)$$

Further, values with respect to each conditional expression in each Example are shown in Table 1.

[Numerical Data 1]

| Unit: mm | | | | | |
|---|---|---|---|---|---|
| Surface data | | | | | |
| Surface number | r | d | nd | vd | Effective diameter |
| 1 | 373.848 | 12.09 | 1.48749 | 70.2 | 141.92 |
| 2 | −1,462.714 | 1.50 | | | 141.47 |
| 3 | 104.955 | 26.00 | 1.43387 | 95.1 | 134.90 |
| 4 | 509.877 | 57.96 | | | 131.31 |
| 5* | 127.444 | 13.32 | 1.48749 | 70.2 | 82.89 |
| 6 | −316.830 | 0.25 | | | 79.63 |
| 7 | −323.653 | 4.60 | 1.67300 | 38.1 | 79.16 |
| 8 | 90.874 | 0.04 | 1.61973 | 43.0 | 70.67 |
| 9 (diffractive) | 90.874 | 0.01 | 1.56691 | 19.4 | 70.65 |
| 10 | 90.874 | 11.74 | 1.48749 | 70.2 | 70.64 |
| 11 | 3,958.723 | 18.00 | | | 67.92 |
| 12 | −967.245 | 4.41 | 1.84666 | 23.9 | 52.36 |
| 13 | −191.049 | 2.60 | 1.61340 | 44.3 | 51.07 |
| 14 | 61.270 | 37.03 | | | 46.35 |
| 15 (stop) | ∞ | 2.50 | | | 34.44 |
| 16 | 124.933 | 1.50 | 1.88300 | 40.8 | 33.12 |
| 17 | 40.642 | 6.00 | 1.48749 | 70.2 | 31.94 |
| 18 | −77.661 | 2.00 | | | 31.74 |
| 19* | 46.025 | 1.80 | 1.65412 | 39.7 | 28.73 |
| 20 | 27.514 | 7.78 | 1.48749 | 70.2 | 27.00 |
| 21 | −65.783 | 1.80 | 1.80610 | 40.9 | 25.42 |
| 22 | 98.358 | 5.00 | | | 24.09 |
| 23 | 89.244 | 3.19 | 1.84666 | 23.9 | 27.12 |
| 24 | −79.604 | 1.80 | 1.88300 | 40.8 | 26.73 |
| 25 | 48.185 | 2.00 | | | 25.07 |
| 26 | −554.688 | 1.80 | 1.88300 | 40.8 | 25.03 |
| 27 | 67.093 | 4.50 | | | 25.44 |
| 28 | 46.892 | 1.50 | 1.88300 | 40.8 | 23.72 |
| 29 | 23.387 | 5.56 | 1.69895 | 30.1 | 23.93 |
| 30 | −50.280 | 3.22 | | | 24.09 |
| 31* | −30.388 | 8.66 | 1.48749 | 70.2 | 24.10 |
| 32 | −16.382 | 1.80 | 1.59522 | 67.7 | 25.31 |
| 33 | 114.048 | 3.96 | | | 28.69 |
| 34 | 102.715 | 2.20 | 1.48749 | 70.2 | 32.32 |
| 35 | 73.807 | 2.00 | 1.52417 | 51.5 | 33.50 |
| 36 | 626.132 | 0.10 | 1.60401 | 20.8 | 33.61 |
| 37 | 58.036 | 7.64 | 1.60342 | 38.0 | 34.53 |
| 38 | −52.101 | 5.00 | | | 35.25 |
| 39 | ∞ | 2.20 | 1.51633 | 64.1 | 36.57 |
| 40 | ∞ | 60.48 | | | 36.81 |
| Image plane | ∞ | | | | |

Aspheric surface data

Fifth surface

K = 0.00000e+000   A1 = −1.80829e−007   A2 = −2.21402e−011
A3 = −4.01177e−015   A4 = 5.36181e−019

Ninth surface (diffractive surface)

C1 = −4.92426e−005   C2 = −2.83767e−009   C3 = 3.18595e−012
C4 = −3.72572e−015   C5 = 1.08281e−018

Nineteenth surface

K = 0.00000e+000   A1 = 1.71414e−006   A2 = 1.87260e−009
A3 = 5.74753e−013   A4 = 5.86519e−015

Thirty-first surface

K = 0.00000e+000   A1 = 7.66880e−006   A2 = 1.38018e−008
A3 = −5.42811e−012   A4 = 2.03217e−013

-continued

Unit: mm

Various data

| | |
|---|---|
| Focal length | 585.00 |
| F-number | 4.12 |
| Half angle of view (degree) | 2.12 |
| Image height | 21.64 |
| Total lens length | 334.78 |
| BF | 66.93 |
| Entrance pupil position | 832.33 |
| Exit pupil position | −91.40 |
| Front principal point position | −835.92 |
| Rear principal point position | −524.53 |

Zoom lens unit data

| Unit | First surface | Focal length | Lens structure length | Front principal point position | Rear principal point position |
|---|---|---|---|---|---|
| 1 | 1 | 169.18 | 127.50 | 17.05 | −90.93 |
| 2 | 12 | −103.32 | 7.01 | 3.83 | −0.16 |
| 3 | 15 | −331.08 | 85.52 | −33.06 | −128.13 |

Single lens data

| Lens | First surface | Focal length |
|---|---|---|
| 1 | 1 | 612.10 |
| 2 | 3 | 298.80 |
| 3 | 5 | 188.29 |
| 4 | 7 | −104.96 |
| 5 | 8 | 10,038.43 |
| 6 | 9 | 10,134.33 |
| 7 | 10 | 190.60 |
| 8 | 12 | 280.46 |
| 9 | 13 | −75.34 |
| 10 | 16 | −68.79 |
| 11 | 17 | 55.65 |
| 12 | 19 | −108.76 |
| 13 | 20 | 40.91 |
| 14 | 21 | −48.66 |
| 15 | 23 | 50.13 |
| 16 | 24 | −33.77 |
| 17 | 26 | −67.69 |
| 18 | 28 | −54.47 |
| 19 | 29 | 23.57 |
| 20 | 31 | 60.63 |
| 21 | 32 | −23.94 |
| 22 | 34 | −551.71 |
| 23 | 35 | 159.42 |
| 24 | 36 | −105.91 |
| 25 | 37 | 46.72 |
| 26 | 39 | 0.00 |

[Numerical Data 2]

Unit: mm

Surface data

| Surface number | r | d | nd | vd | Effective diameter |
|---|---|---|---|---|---|
| 1 | 180.544 | 15.00 | 1.48749 | 70.2 | 141.92 |
| 2 | 800.000 | 0.01 | 1.56691 | 19.4 | 140.94 |
| 3 (diffractive) | 800.000 | 0.04 | 1.61973 | 43.0 | 140.93 |
| 4 | 800.000 | 1.50 | | | 140.92 |
| 5 | 101.105 | 26.00 | 1.43387 | 95.1 | 133.26 |
| 6 | 440.783 | 45.27 | | | 129.20 |
| 7* | 237.268 | 5.40 | 1.60562 | 43.7 | 88.87 |
| 8 | 47.305 | 21.40 | 1.48749 | 70.2 | 75.34 |
| 9 | 327.376 | 29.69 | | | 72.77 |
| 10 | 977.710 | 4.50 | 1.84666 | 23.9 | 52.89 |
| 11 | −306.210 | 2.60 | 1.61340 | 44.3 | 51.68 |
| 12 | 70.128 | 40.00 | | | 47.87 |
| 13 (stop) | ∞ | 2.50 | | | 35.74 |
| 14 | 58.321 | 1.50 | 1.88300 | 40.8 | 34.04 |
| 15 | 28.792 | 6.00 | 1.48749 | 70.2 | 32.23 |
| 16 | 4,904.968 | 2.00 | | | 31.96 |
| 17* | 33.200 | 1.80 | 1.65412 | 39.7 | 29.85 |
| 18 | 20.813 | 8.71 | 1.48749 | 70.2 | 27.67 |
| 19 | −192.705 | 1.80 | 1.80610 | 40.9 | 26.06 |
| 20 | 73.890 | 5.24 | | | 24.71 |
| 21 | 85.999 | 3.50 | 1.84666 | 23.9 | 26.92 |
| 22 | −62.819 | 1.80 | 1.88300 | 40.8 | 26.51 |
| 23 | 40.471 | 2.38 | | | 24.55 |
| 24 | −275.465 | 1.80 | 1.88300 | 40.8 | 24.51 |
| 25 | 78.542 | 4.50 | | | 25.04 |
| 26 | 48.207 | 1.50 | 1.88300 | 40.8 | 24.31 |
| 27 | 24.227 | 4.79 | 1.69895 | 30.1 | 24.56 |
| 28 | −119.379 | 3.36 | | | 24.74 |
| 29* | −48.973 | 8.06 | 1.48749 | 70.2 | 25.28 |
| 30 | −21.674 | 1.80 | 1.59522 | 67.7 | 26.86 |
| 31 | −65.776 | 2.50 | | | 28.89 |
| 32 | 171.229 | 2.20 | 1.48749 | 70.2 | 30.81 |
| 33 | 30.283 | 2.00 | 1.52417 | 51.5 | 32.06 |
| 34 | 46.041 | 0.10 | 1.60401 | 20.8 | 32.11 |
| 35 | 30.179 | 6.61 | 1.60342 | 38.0 | 32.34 |
| 36 | 1,310.397 | 5.00 | | | 32.58 |
| 37 | ∞ | 2.20 | 1.51633 | 64.1 | 33.61 |
| 38 | ∞ | 60.48 | | | 33.91 |
| Image plane | ∞ | | | | |

Aspheric surface data

Third surface (diffractive surface)

C1 = −1.43951e−005   C2 = 5.52105e−011   C3 = −3.15203e−014
C4 = 6.51838e−018    C5 = −1.71601e−022

Seventh surface

K = 0.00000e+000    A1 = −1.28122e−007   A2 = −9.97798e−013
A3 = 1.36605e−015   A4 = −8.00161e−020

Seventeenth surface

K = 0.00000e+000    A1 = 2.41578e−006    A2 = 2.94806e−009
A3 = 7.30478e−013   A4 = 1.23580e−014

Twenty-ninth surface

K = 0.00000e+000    A1 = 2.24908e−006    A2 = 2.72593e−009
A3 = −4.02798e−012  A4 = 4.19607e−014

Various data

| | |
|---|---|
| Zoom ratio | 1.00 |
| Focal length | 585.00 |
| F-number | 4.12 |
| Half angle of view (degree) | 2.12 |
| Image height | 21.64 |
| Total lens length | 334.78 |
| BF | 66.93 |
| Entrance pupil position | 849.33 |
| Exit pupil position | −70.14 |
| Front principal point position | −1185.60 |
| Rear principal point position | −524.52 |

-continued

Unit: mm

Zoom lens unit data

| Unit | First surface | Focal length | Lens structure length | Front principal point position | Rear principal point position |
|---|---|---|---|---|---|
| 1 | 1 | 208.59 | 114.62 | −25.40 | −103.23 |
| 2 | 10 | −141.26 | 7.10 | 4.74 | 0.67 |
| 3 | 13 | −266.99 | 83.64 | 27.35 | −45.34 |

Single lens data

| Lens | First surface | Focal length |
|---|---|---|
| 1 | 1 | 474.53 |
| 2 | 2 | 34,732.65 |
| 3 | 3 | 34,717.82 |
| 4 | 5 | 295.55 |
| 5 | 7 | −98.62 |
| 6 | 8 | 110.66 |
| 7 | 10 | 275.85 |
| 8 | 11 | −92.78 |
| 9 | 14 | −65.97 |
| 10 | 15 | 59.39 |
| 11 | 17 | −90.48 |
| 12 | 18 | 39.05 |
| 13 | 19 | −66.06 |
| 14 | 21 | 43.34 |
| 15 | 22 | −27.65 |
| 16 | 24 | −69.05 |
| 17 | 26 | −56.82 |
| 18 | 27 | 29.22 |
| 19 | 29 | 72.72 |
| 20 | 30 | −55.15 |
| 21 | 32 | −75.86 |
| 22 | 33 | 161.75 |
| 23 | 34 | −145.38 |
| 24 | 35 | 51.09 |
| 25 | 37 | 0.00 |

[Numerical Data 3]

Unit: mm

Surface data

| Surface number | r | d | nd | vd | Effective diameter |
|---|---|---|---|---|---|
| 1 | 215.064 | 10.68 | 1.48749 | 70.2 | 141.92 |
| 2 | 506.012 | 1.50 | | | 141.11 |
| 3 | 108.305 | 26.00 | 1.43387 | 95.1 | 136.94 |
| 4 | 546.706 | 63.21 | | | 133.55 |
| 5* | 120.910 | 13.82 | 1.48749 | 70.2 | 83.65 |
| 6 | −315.301 | 0.28 | | | 80.48 |
| 7 | −303.426 | 4.60 | 1.67300 | 38.1 | 80.21 |
| 8 | 94.138 | 0.04 | 1.61973 | 43.0 | 71.99 |
| 9 (diffractive) | 94.138 | 0.01 | 1.56691 | 19.4 | 71.97 |
| 10 | 94.138 | 11.74 | 1.48749 | 70.2 | 71.96 |
| 11 | 3958.723 | 20.92 | | | 69.37 |
| 12 | 379.331 | 4.50 | 1.84666 | 23.9 | 51.21 |
| 13 | −528.291 | 2.60 | 1.76200 | 40.1 | 49.70 |
| 14 | 59.566 | 34.65 | | | 45.62 |
| 15 (stop) | ∞ | 2.50 | | | 36.26 |
| 16 | 552.053 | 3.17 | 1.51742 | 52.4 | 35.40 |
| 17 | −141.259 | 4.30 | 1.48749 | 70.2 | 34.99 |
| 18 | −83.079 | 2.00 | | | 34.14 |
| 19* | 85.835 | 1.80 | 1.59522 | 67.7 | 31.04 |
| 20 | 28.548 | 9.23 | 1.48749 | 70.2 | 28.83 |
| 21 | −41.511 | 1.80 | 1.88300 | 40.8 | 27.39 |
| 22 | −2,249.924 | 5.00 | | | 26.53 |
| 23 | 88.934 | 3.50 | 1.75520 | 27.5 | 28.92 |
| 24 | −87.807 | 1.80 | 1.77250 | 49.6 | 28.49 |
| 25 | 44.929 | 2.95 | | | 26.64 |
| 26 | −121.483 | 1.80 | 1.77250 | 49.6 | 26.60 |
| 27 | 96.741 | 12.00 | | | 26.80 |
| 28 | 78.848 | 1.50 | 1.88300 | 40.8 | 31.63 |
| 29 | 37.737 | 4.56 | 1.64769 | 33.8 | 32.26 |
| 30 | −536.709 | 2.27 | | | 32.51 |
| 31* | 52.478 | 9.38 | 1.72151 | 29.2 | 35.67 |
| 32 | −90.562 | 1.80 | 1.59522 | 67.7 | 35.60 |
| 33 | 79.828 | 6.53 | | | 35.34 |
| 34 | −316.229 | 1.50 | 1.92286 | 18.9 | 36.14 |
| 35 | 30.664 | 5.10 | 1.84666 | 23.8 | 37.46 |
| 36 | 65.899 | 8.84 | 1.76182 | 26.5 | 37.81 |
| 37 | −107.844 | 5.00 | | | 39.00 |
| 38 | ∞ | 2.20 | 1.51633 | 64.1 | 40.41 |
| 39 | ∞ | 64.40 | | | 40.71 |
| Image plane | ∞ | | | | |

Aspheric surface data

Fifth surface

K = 0.00000e+000    A1 = −1.96296e−007    A2 = −2.87452e−011
A3 = −2.57596e−015    A4 = 2.90708e−019

Ninth surface (diffractive surface)

C1 = −5.61181e−005    C2 = 4.42883e−011    C3 = −5.63549e−013
C4 = −1.46893e−015    C5 = 6.39877e−019

Nineteenth surface

K = 0.00000e+000    A1 = 1.07522e−006    A2 = 1.34109e−009
A3 = −1.99251e−012    A4 = 6.32980e−015

Thirty-first surface

K = 0.00000e+000    A1 = 3.45844e−007    A2 = −2.47799e−010
A3 = 1.26446e−012    A4 = −1.23886e−015

Various data

| Zoom ratio | 1.00 |
|---|---|
| Focal length | 585.01 |
| F-number | 4.12 |
| Half angle of view (degree) | 2.12 |
| Image height | 21.64 |
| Total lens length | 358.73 |
| BF | 70.85 |
| Entrance pupil position | 807.96 |
| Exit pupil position | −98.96 |
| Front principal point position | −701.89 |
| Rear principal point position | −520.60 |

Zoom lens unit data

| Unit | First surface | Focal length | Lens structure length | Front principal point position | Rear principal point position |
|---|---|---|---|---|---|
| 1 | 1 | 178.68 | 131.88 | 19.46 | −94.85 |
| 2 | 12 | −97.22 | 7.10 | 4.83 | 0.87 |
| 3 | 15 | −832.16 | 100.53 | −90.38 | −200.36 |

Single lens data

| Lens | First surface | Focal length |
|---|---|---|
| 1 | 1 | 758.15 |
| 2 | 3 | 305.81 |
| 3 | 5 | 181.16 |
| 4 | 7 | −106.26 |
| 5 | 8 | 8,827.05 |
| 6 | 9 | 8,895.77 |
| 7 | 10 | 197.61 |
| 8 | 12 | 261.38 |
| 9 | 13 | −70.12 |
| 10 | 16 | 217.72 |

-continued

Unit: mm

| | | |
|---|---|---|
| 11 | 17 | 403.99 |
| 12 | 19 | -72.72 |
| 13 | 20 | 36.26 |
| 14 | 21 | -47.91 |
| 15 | 23 | 59.01 |
| 16 | 24 | -38.25 |
| 17 | 26 | -69.47 |
| 18 | 28 | -83.40 |
| 19 | 29 | 54.61 |
| 20 | 31 | 47.35 |
| 21 | 32 | -71.00 |
| 22 | 34 | -30.23 |
| 23 | 35 | 63.52 |
| 24 | 36 | 54.90 |
| 25 | 38 | 0.00 |

TABLE 1

| Conditional expression number | Lower limit value | Upper limit value | Example 1 | Example 2 | Example 3 |
|---|---|---|---|---|---|
| (1) | 0.001 | 0.010 | 0.0042 | 0.0046 | 0.0042 |
| (2) | 0.0001 | 0.0010 | 0.00024 | 0.00019 | 0.00036 |
| (3) | -0.600 | -0.010 | -0.309 | -0.345 | -0.067 |
| (4) | 0.010 | 0.100 | 0.047 | 0.055 | 0.047 |
| (5) | 0.001 | 0.010 | 0.004 | 0.005 | 0.004 |
| (6) | -0.100 | -0.005 | -0.076 | -0.012 | -0.037 |
| (7) | -1.00 | -0.05 | -0.398 | -0.195 | -0.491 |
| (8) | 0.05 | 1.00 | 0.547 | 0.232 | 0.190 |
| (9) | 0.05 | 0.50 | 0.173 | 0.135 | 0.176 |

According to the present invention, an optical material (mainly a glass material) having a material characteristic optimum for a dispersion characteristic of the diffractive optical element is used for the refractive optical element in the optical system using the diffractive optical element. Thus, it is possible to provide the downsized and lightweight optical system in which a chromatic aberration is satisfactorily corrected over the entire visible wavelength range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-043748, filed Mar. 8, 2017, which is hereby incorporated by reference herein in its entirety.

What is claimed is:

1. An optical system, comprising a front unit, an aperture stop, and a rear unit, which are arranged in order from an object side to an image side,
the front unit comprising a diffractive optical element, at least one first refractive optical element having a power in the same sign as a sign of a power of a diffractive surface of the diffractive optical element, and at least one second refractive optical element having a power in a different sign from the sign of the power of the diffractive surface,
wherein the following conditional expression is satisfied:

$$0.001 < \sum_{i=1}^{M} |\delta\theta_{dC\text{-}fsi}|/M < 0.010$$

where $\delta\theta_{dC\text{-}fsi}$ is defined as $\theta_{dC\text{-}fsi}-(-0.1968\times\theta_{gd\text{-}fsi}+0.548)$, and $\theta_{dC\text{-}fsi}$ and $\theta_{gd\text{-}fsi}$ represent a partial dispersion ratio between a d-line and a C-line and a partial dispersion ratio between a g-line and the d-line, respectively, of a material of an i-th (i is an integer of 1 or more and M or less, and M is an integer of 1 or more) first refractive optical element counted from the object side among the at least one first refractive optical element,
wherein the following conditional expression is satisfied:

$$0.0001 < \sum_{j=1}^{N} |\delta\theta_{dC\text{-}fdj}|/N < 0.0010$$

where $\delta\theta_{dC\text{-}fdj}$ is defined as $\theta_{dC\text{-}fdj}-(-0.1968\times\theta_{gd\text{-}fdj}+0.548)$, and $\theta_{dC\text{-}fdj}$ and $\theta_{gd\text{-}fdj}$ represent a partial dispersion ratio between the d-line and the C-line and a partial dispersion ratio between the g-line and the d-line, respectively, of a material of a j-th (j is an integer of 1 or more and N or less, and N is an integer of 1 or more) second refractive optical element counted from the object side among the at least one second refractive optical element, and
wherein the following conditional expression is satisfied:

$$0.001 < \sum_{j=1}^{N} |\Delta\theta_{gd\text{-}fdj}|/N < 0.010$$

where $\Delta\theta_{gd\text{-}fdj}$ is defined as $\theta_{gd\text{-}fdj}-(-1.687\times10^{-7}\times vd_{fdj}^3 + 5.702\times10^{-5}\times vd_{fdj}^2 - 6.603\times10^{-3}\times vd_{fdj}+1.462)$, and $vd_{fdj}$ represents an Abbe number of the material of the j-th (j is an integer of 1 or more and N or less, and N is an integer of 1 or more) refractive optical element counted from the object side among the at least one second refractive optical element.

2. An optical system according to claim 1,
wherein the rear unit consists of only refractive optical elements, and
wherein the following conditional expression is satisfied:

$$-0.60 < \sum_{i=1}^{K} \frac{\phi_{bi}}{vd_{bi}}\delta\theta_{dC\text{-}bi}h_{bi}^2 \bigg/ \frac{\phi_{DO}}{vd_{DO}}\delta\theta_{dC\text{-}DO}h_{DO}^2 < -0.01$$

where $\delta\theta_{dC\text{-}bi}$ is defined as $\theta_{dC\text{-}bi}-(-0.1968\times\theta_{gd\text{-}bi}+0.548)$, and $\theta_{dC\text{-}bi}$ and $\theta_{dC\text{-}bi}$ represent a partial dispersion ratio between the d-line and the C-line and a partial dispersion ratio between the g-line and the d-line, respectively, of a material of an i-th (i is an integer of 1 or more and K or less, and K is an integer of 1 or more) refractive optical element counted from the object side in the rear unit,
where $\delta\theta_{dC\text{-}DO}$ is defined as $\theta_{dC\text{-}DO}-(-0.1968\times\theta_{dC\text{-}DO}+0.548)$, and $\theta_{dC\text{-}DO}$ and $\theta_{dC\text{-}DO}$ represent a partial dispersion ratio between the d-line and the C-line and a partial dispersion ratio between the g-line and the d-line, respectively, at the diffractive surface of the diffractive optical element, and
where $\varphi_{bi}$ represents a power of the i-th refractive optical element counted from the object side in the rear unit, $vd_{bi}$ represents an Abbe number of the material of the i-th refractive optical element, $h_{bi}$ represents a height of incidence of an axial paraxial ray at a position at which the i-th refractive optical element is arranged in the optical system, $\varphi_{DO}$ represents a power of the diffractive surface of the diffractive optical element, $vd_{DO}$ represents an Abbe number at the diffractive surface of the diffractive optical element, and $h_{DO}$ represents a height of incidence of an axial paraxial ray at a position at which the diffractive surface is arranged in the optical system.

3. An optical system according to claim 1, wherein the following conditional expression is satisfied:

$$0.010 < \sum_{i=1}^{M} |\Delta \theta_{gd-fsi}|/M < 0.100$$

where $\Delta \theta_{gd-fsi}$ is defined as $\theta_{gd-fsi}-(-1.687\times 10^{-7}\times vd_{fsi}^3 + 5.702\times 10^{-5}\times vd_{fsi}^2 - 6.603\times 10^{-3}\times Vd_{fsi}+1.462)$, and $vd_{fsi}$ represents an Abbe number of the material of the i-th (i is an integer of 1 or more and M or less, and M is an integer of 1 or more) refractive optical element counted from the object side among the at least one first refractive optical element.

4. An optical system according to claim 1, wherein the rear unit consists of only refractive optical elements, and wherein the following conditional expression is satisfied:

$$-0.100 < \sum_{i=1}^{K} \frac{\phi_{bi}}{vd_{bi}} \Delta \theta_{gd-bi} h_{bi}^2 \Big/ \frac{\phi_{DO}}{vd_{DO}} \Delta \theta_{gd-DO} h_{DO}^2 < -0.005$$

where $\Delta \theta_{gd-bi}$ is defined as $\theta_{gd-bi}-(-1.687\times 10^{-7}\times Vd_{bi}^3 + 5.702\times 10^{-5}\times vd_{bi}^2 - 6.603\times 10^{-3}\times vd_{bi}+1.462)$, and $\theta_{gd-bi}$ and $vd_{bi}$ represent a partial dispersion ratio between the g-line and the d-line and an Abbe number, respectively, of a material of an i-th (i is an integer of 1 or more and K or less, and K is an integer of 1 or more) refractive optical element counted from the object side in the rear unit, where $\Delta \theta_{gd-DO}$ is defined as $\theta_{gd-DO}-(-1.687\times 10^{-7} vd_{DO}^3 + 5.702\times 10^{-5}\times vd_{DO}^2 - 6.603\times 10^{-3}\times vd_{DO}+1.462)$, and $\theta_{gd-DO}$ and $vd_{DO}$ represent a partial dispersion ratio between the g-line and the d-line and an Abbe number, respectively, at the diffractive surface of the diffractive optical element, and where $\varphi_{bi}$ represents a power of the i-th refractive optical element counted from the object side in the rear unit, $h_{bi}$ represents a height of incidence of an axial paraxial ray at a position at which the i-th refractive optical element is arranged in the optical system, $\varphi_{DO}$ represents a power of the diffractive surface of the diffractive optical element, and $h_{DO}$ represents a height of incidence of an axial paraxial ray at a position at which the diffractive surface is arranged in the optical system.

5. An optical system according to claim 1, wherein the rear unit consists of only refractive optical elements, and wherein the following conditional expressions are satisfied:

$$-1.00 < \sum_{i=1}^{K} \frac{\phi_{bi}}{vd_{bi}} \delta \theta_{dC-bi} h_{bi} \bar{h}_{bi} \Big/ \frac{\phi_{DO}}{vd_{DO}} \delta \theta_{dC-DO} h_{DO} \bar{h}_{DO} < -0.05$$

$$0.05 < \sum_{i=1}^{K} \frac{\phi_{bi}}{vd_{bi}} \Delta \theta_{gd-bi} h_{bi} \bar{h}_{bi} \Big/ \frac{\phi_{DO}}{vd_{DO}} \Delta \theta_{gd-DO} h_{DO} \bar{h}_{DO} < 1.00$$

where $\delta \theta_{dC-bi}$ is defined as $\theta_{dC-bi}-(-0.1968\times \theta_{gd-bi}+0.548)$, and $\theta_{dC-bi}$ and $\theta_{gd-bi}$ represent a partial dispersion ratio between the d-line and the C-line and a partial dispersion ratio between the g-line and the d-line, respectively, of a material of an i-th (i is an integer of 1 or more and K or less, and K is an integer of 1 or more) refractive optical element counted from the object side in the rear unit, where $\delta \theta_{dC-DO}$ is defined as $\theta_{dc-Do}-(-0.1968\times \theta_{gd-DO}+0.548)$, and $\theta_{dC-DO}$ and $\theta_{gd-DO}$ represent a partial dispersion ratio between the d-line and the C-line and a partial dispersion ratio between the g-line and the d-line, respectively, at the diffractive surface of the diffractive optical element, where $\Delta \theta_{gd-bi}$ is defined as $\theta_{gd-bi}-(-1.687\times 10^{-7}\times vd_{bi}^3 + 5.702\times 10^{-5}\times vd_{bi}^2 - 6.603\times 10^{-3}\times vd_{bi}+1.462)$, and $\theta_{gd-bi}$ and $vd_{bi}$ represent a partial dispersion ratio between the g-line and the d-line and an Abbe number, respectively, of the material of the i-th (i is an integer of 1 or more and K or less, and K is an integer of 1 or more) refractive optical element counted from the object side in the rear unit, where $\Delta \theta_{gd-DO}$ is defined as $\theta_{gd-DO}-(-1.687\times 10^{-7}\times vd_{DO}^3\times 5.702\times 10^{-5}\times vd_{DO}^2 - 6.603\times 10^{-3} vd_{DO}+1.462)$, and $\theta_{gd-DO}$ and $vd_{DO}$ represent a partial dispersion ratio between the g-line and the d-line and an Abbe number, respectively, at the diffractive surface of the diffractive optical element, where $\varphi_{bi}$ represents a power of the i-th refractive optical element counted from the object side in the rear unit, $h_{bi}$ represents a height of incidence of an axial paraxial ray at a position at which the i-th refractive optical element is arranged in the optical system, $\varphi_{DO}$ represents a power of the diffractive surface of the diffractive optical element, and $h_{DO}$ represents a height of incidence of an axial paraxial ray at a position at which the diffractive surface is arranged in the optical system, and where $\bar{h}_{bi}$ represents a height of incidence of a pupil paraxial ray at a position at which the i-th refractive optical element counted from the object side of the rear unit is arranged in the optical system, and $\bar{h}_{DO}$ represents a height of incidence of a pupil paraxial ray at a position at which the diffractive surface is arranged in the optical system, in the diffractive optical element and the i-th (i is an integer of 1 or more and K or less, and K is an integer of 1 or more) refractive optical element counted from the object side in the rear unit.

6. An optical system according to claim 1, wherein the following conditional expression is satisfied:

$$0.05 < L_{fl}/L_{TOT} < 0.50,$$

where $L_{fl}$ represents a largest length among intervals on an optical axis of the at least one first refractive optical element and the at least one second refractive optical element, and $L_{TOT}$ represents a total lens length when focused on an object at infinity.

7. An optical system according to claim 1, wherein the diffractive surface of the diffractive optical element is formed at a cemented surface of a cemented lens, the cemented lens being formed of one of: optical members each made of a glass material; and optical members each made of a resin material having a thickness of 0.1 mm or less on an optical axis.

8. An optical system according to claim 1, wherein the optical system has a telephoto ratio of 0.7 or less.

9. An optical system according to claim 1,
wherein the front unit comprises a first lens unit having a positive power and a second lens unit having a negative power,
wherein the second lens unit is configured to move on an optical axis during change in focus from an object at infinity to an object in a close distance,
wherein the rear unit comprises a third lens unit, and
wherein the first lens unit comprises the diffractive optical element and an aspheric surface.

10. An optical system according to claim 9, wherein the first lens unit comprises a refractive optical element made of a material having a specific gravity of 3.5 or less.

11. An optical system according to claim 9, wherein the third lens unit comprises at least one aspheric surface.

12. An optical system according to claim 9, wherein the third lens unit comprises a lens unit configured to move in a direction having a component perpendicular to the optical axis during image blur correction.

13. An image pickup apparatus, comprising:
an optical system; and
an image pickup element, which is configured to receive light of an image formed by the optical system,
wherein the optical system comprises a front unit, an aperture stop, and a rear unit, which are arranged in order from an object side to an image side,
wherein the front unit comprises a diffractive optical element, at least one first refractive optical element having a power in the same sign as a sign of a power of a diffractive surface of the diffractive optical element, and at least one second refractive optical element having a power in a different sign from the sign of the power of the diffractive surface, wherein the following conditional expression is satisfied:

$$0.001 < \sum_{i=1}^{M} |\delta\theta_{dC-fsi}|/M < 0.010$$

where $\Delta\theta_{dC-fsi}$ is defined as $\theta_{dC-fsi} - (-0.1968 \times \theta_{gd-fsi} + 0.548)$, and $\theta_{dC-fsi}$ and $\theta_{gd-fsi}$ represent a partial dispersion ratio between a d-line and a C-line and a partial dispersion ratio between a g-line and the d-line, respectively, of a material of an i-th (i is an integer of 1 or more and M or less, and M is an integer of 1 or more) first refractive optical element counted from the object side among the at least one first refractive optical element,
wherein the following conditional expression is satisfied:

$$0.0001 < \sum_{j=1}^{N} |\delta\theta_{dC-fdj}|/N < 0.0010$$

where $\Delta\theta_{dC-fdj}$ is defined as $\theta_{dC-fdj} - (-0.1968 \times \theta_{gd-fdj} + 0.548)$, and $\theta_{dC-fdj}$ and $\theta_{gd-fdj}$ represent a partial dispersion ratio between the d-line and the C-line and a partial dispersion ratio between the g-line and the d-line, respectively, of a material of a j-th (j is an integer of 1 or more and N or less, and N is an integer of 1 or more) second refractive optical element counted from the object side among the at least one second refractive optical element, and
wherein the following conditional expression is satisfied:

$$0.001 < \sum_{j=1}^{N} |\Delta\theta_{gd-fdj}|/N < 0.010$$

where $\Delta\theta_{gd-fdj}$ is defined as $\theta_{gd-fdj} - (-1.687 \times 10^{-7} \times vd_{fdj}^3 + 5.702 \times 10^{-5} \times vd_{fdj}^2 - 6.603 \times 10^{-3} \times vd_{fdj} + 1.462)$, and $vd_{fdj}$ represents an Abbe number of the material of the j-th (j is an integer of 1 or more and N or less, and N is an integer of 1 or more) refractive optical element counted from the object side among the at least one second refractive optical element.

* * * * *